(12) United States Patent
Choi et al.

(10) Patent No.: US 12,192,393 B2
(45) Date of Patent: Jan. 7, 2025

(54) ELECTRONIC DEVICE INCLUDING FLEXIBLE DISPLAY

(71) Applicant: Samsung Electronics Co., Ltd., Suwon-si (KR)

(72) Inventors: Junyoung Choi, Suwon-si (KR); Youngmin Kang, Suwon-si (KR); Myunghoon Kwak, Suwon-si (KR); Moonchul Shin, Suwon-si (KR); Yeonggyu Yoon, Suwon-si (KR); Seungjoon Lee, Suwon-si (KR); Joongyeon Cho, Suwon-si (KR); Junghyun Ahn, Suwon-si (KR); Byounguk Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 17/713,508

(22) Filed: Apr. 5, 2022

(65) Prior Publication Data
US 2022/0368787 A1    Nov. 17, 2022

Related U.S. Application Data

(63) Continuation of application No. PCT/KR2022/004710, filed on Apr. 1, 2022.

(30) Foreign Application Priority Data

May 17, 2021    (KR) .......................... 10-2021-0063349

(51) Int. Cl.
*H04M 1/02* (2006.01)
*G06F 1/16* (2006.01)

(52) U.S. Cl.
CPC ........ *H04M 1/0268* (2013.01); *G06F 1/1624* (2013.01); *G06F 1/1652* (2013.01); *H04M 1/0237* (2013.01); *H04M 2201/38* (2013.01)

(58) Field of Classification Search
CPC . H04M 1/0208; H04M 1/0235; H04M 1/0239
See application file for complete search history.

(56) References Cited

U.S. PATENT DOCUMENTS 9,195,272 B2    11/2015    O'Brien
10,871,797 B1 *    12/2020    Jo .......................... G06F 1/1624
(Continued)

FOREIGN PATENT DOCUMENTS

KR    10-2019-0143029 A    12/2019
KR    10-2020-0013821 A    2/2020
(Continued)

OTHER PUBLICATIONS

International Search Report dated Jul. 12, 2022, issued in an International Application No. PCT/KR2022/004710.
(Continued)

*Primary Examiner* — Angelica Perez
(74) *Attorney, Agent, or Firm* — Jefferson IP Law, LLP

(57) ABSTRACT

An electronic device is provided. The electronic device includes a first housing including a first space, a second housing slidably coupled to the first housing along a first direction and including a second space, a bendable member connected to the first housing, at least partially accommodated in the second space in a slide-in state, and at least partially forming the same plane with the first housing in a slide-out state, a support plate including a plate part, and a pressing part extending from the plate part and supporting at least a portion of the bent bendable member in the slide-in state, the plate part including a first surface facing the bendable member, and a second surface facing a direction opposite to a direction of the first surface, and a flexible display disposed to be supported by at least a portion of the bendable member and at least a portion of the first housing.

19 Claims, 28 Drawing Sheets

(56) References Cited

U.S. PATENT DOCUMENTS

| | | |
|---|---|---|
| 10,880,417 B1 | 12/2020 | Song et al. |
| 10,955,876 B1* | 3/2021 | Song .................. G06F 1/1652 |
| 11,003,219 B1 | 5/2021 | Kim et al. |
| 2006/0291925 A1* | 12/2006 | Kim .................. G03G 15/2053 |
| | | 399/333 |
| 2013/0292232 A1* | 11/2013 | Wang .................. B65G 49/064 |
| | | 198/780 |
| 2020/0033913 A1 | 1/2020 | Yang |
| 2020/0264660 A1 | 8/2020 | Song et al. |
| 2021/0044683 A1 | 2/2021 | He et al. |
| 2021/0219437 A1 | 7/2021 | Kim et al. |
| 2022/0078270 A1* | 3/2022 | Song .................. G06F 1/1652 |
| 2022/0174829 A1* | 6/2022 | Choi .................. G06F 1/1624 |
| 2022/0180777 A1* | 6/2022 | Liu .................. H04M 1/0237 |
| 2022/0201880 A1* | 6/2022 | Choi .................. G09F 9/30 |
| 2022/0253103 A1 | 8/2022 | Choi et al. |
| 2023/0095247 A1* | 3/2023 | Feng .................. G09F 9/301 |
| | | 361/679.27 |
| 2023/0176622 A1* | 6/2023 | Kim .................. G06F 1/1652 |
| | | 345/156 |
| 2023/0345655 A1* | 10/2023 | Sano .................. G06F 1/1624 |

FOREIGN PATENT DOCUMENTS

| | | |
|---|---|---|
| KR | 10-2020-0117741 A | 10/2020 |
| KR | 10-2022-0008732 A | 1/2022 |
| KR | 10-2022-0035089 A | 3/2022 |
| KR | 10-2022-0088879 A | 6/2022 |
| KR | 10-2022-0118466 A | 8/2022 |
| WO | 2021/015310 A1 | 1/2021 |

OTHER PUBLICATIONS

European Search Report dated Jun. 7, 2024, issued in European Application No. 22804829.4.

* cited by examiner

ELECTRONIC DEVICE INCLUDING FLEXIBLE DISPLAY

CROSS-REFERENCE TO RELATED APPLICATION(S)

This application is a continuation application, claiming priority under § 365(c), of an International application No. PCT/KR2022/004710, filed on Apr. 1, 2022, which is based on and claims the benefit of a Korean patent application number 10-2021-0063349, filed on May 17, 2021, in the Korean Intellectual Property Office, the disclosure of which is incorporated by reference herein in its entirety.

TECHNICAL FIELD

The disclosure relates to an electronic device including a flexible display.

BACKGROUND ART

Electronic devices have gradually become slimmer and have been improved to differentiate functional elements thereof in line with increased rigidity and enhanced design aspects thereof. Electronic devices have evolved from simple quadrangular shapes to more diversified shapes. An electronic device may have a deformable structure such that a large-screen display can be used while guaranteeing portability. For example, as an example of the deformable structure, an electronic device may have a structure (for example, rollable structure or slidable structure) such that the display area of the flexible display can be varied through support of housings that operate in a sliding type with regard to each other. Reliability needs to be secured regarding use of the flexible display, regardless of the deformation status, in the case of such an electronic device.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

Electronic devices may include a rollable electronic device (for example, slidable electronic device), the display area of the display of which can be expanded and/or reduced. The rollable electronic device may include a first housing (for example, first housing structure, base housing, base bracket, or base structure) and a second housing (for example, second housing structure, sliding housing, sliding bracket, or sliding structure) which may be at least partially fitted together and coupled such that they can move with regard to each other. For example, the first housing and the second housing may operate so as to slide with regard to each other, and may support least a part of the flexible display (for example, expandable display or stretchable display) such that, in a slide-in state, the flexible display is guided to have a first display area and, in a slide-out state, the flexible display is guided to have a second display area larger than the first display area.

The rollable electronic device may include a bendable member (for example, multi-bar assembly) for supporting at least a part of the flexible display when the second housing moves from the first housing by a designated distance. When the electronic device is in a slide-in state, at least a part of the flexible display may slide into the inner space of the first housing or into the inner space of the second housing in a bent state, while being supported by the bendable member.

However, even if the bendable flexible display is bent while being supported by the bendable member, the same may be lifted from the first or second housing by a restoring force that tends to unfold the same, thereby providing the user with a degraded surface quality. In order to reduce such lifting, a support member may be provided between the bendable member and the first housing and/or the second housing, but such a support member may consequently degrade the assembly characteristics of the bendable member.

Aspects of the disclosure are to address at least the above-mentioned problems and/or disadvantages and to provide at least the advantages described below. Accordingly, an aspect of the disclosure is to provide an electronic device including a flexible display.

Another aspect of the disclosure is to provide an electronic device including a flexible display, wherein during a transition from a slide-in state to a slide-out state, the flexible display is continuously supported, thereby serving to secure the surface quality of the flexible display.

Another aspect of the disclosure is to provide an electronic device including a flexible display having an improved assembly structure for a bendable member.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a first housing including a first space, a second housing coupled to the first housing to be slidable along a first direction and including a second space, a bendable member connected to the first housing, at least partially received in the second space in a slide-in state, and at least partially forming an identical plane with the first housing in a slide-out state, a support plate including a plate part, and a pressing part extending from the plate part and configured to support at least a portion of the bent bendable member in the slide-in state, the plate part including a first surface facing the bendable member, and a second surface facing a direction opposite to the first surface, and a flexible display disposed to be supported by at least a portion of the bendable member and at least a portion of the first housing, wherein the support plate includes a guide slit formed through the plate part to have a length along a first direction, and wherein the bendable member includes a plurality of engaging protrusions protruding at a predetermined interval and configured to penetrate the guide slit.

In accordance with another aspect of the disclosure, a display device is provided. The device includes a flexible display including a bent region that is at least partially bent according to deformation of at least one housing, a bendable member disposed to support at least the bent region, and a plurality of engaging protrusions formed on the bendable member at a predetermined interval along a bending direction, wherein when the bendable member is bent, the plurality of engaging protrusions become thinner as the engaging protrusions protrude further away from the bendable member, respectively.

Advantageous Effects of Invention

An electronic device according to various embodiments of the disclosure may include a lifting prevention structure such that the bendable member has multiple engaging protrusions disposed at a designated interval along the direction of movement, and the second housing has a guide slot with which the multiple engaging protrusions engage to be guided thereby. As a result, lifting of the flexible display during operations is reduced, thereby serving to improve the surface quality of the flexible display. In addition, the guide slit having an open structure on one side facilitates reception of the multiple engaging protrusions, thereby serving to improve the assembly characteristics of the bendable member.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

BEST MODE FOR CARRYING OUT THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
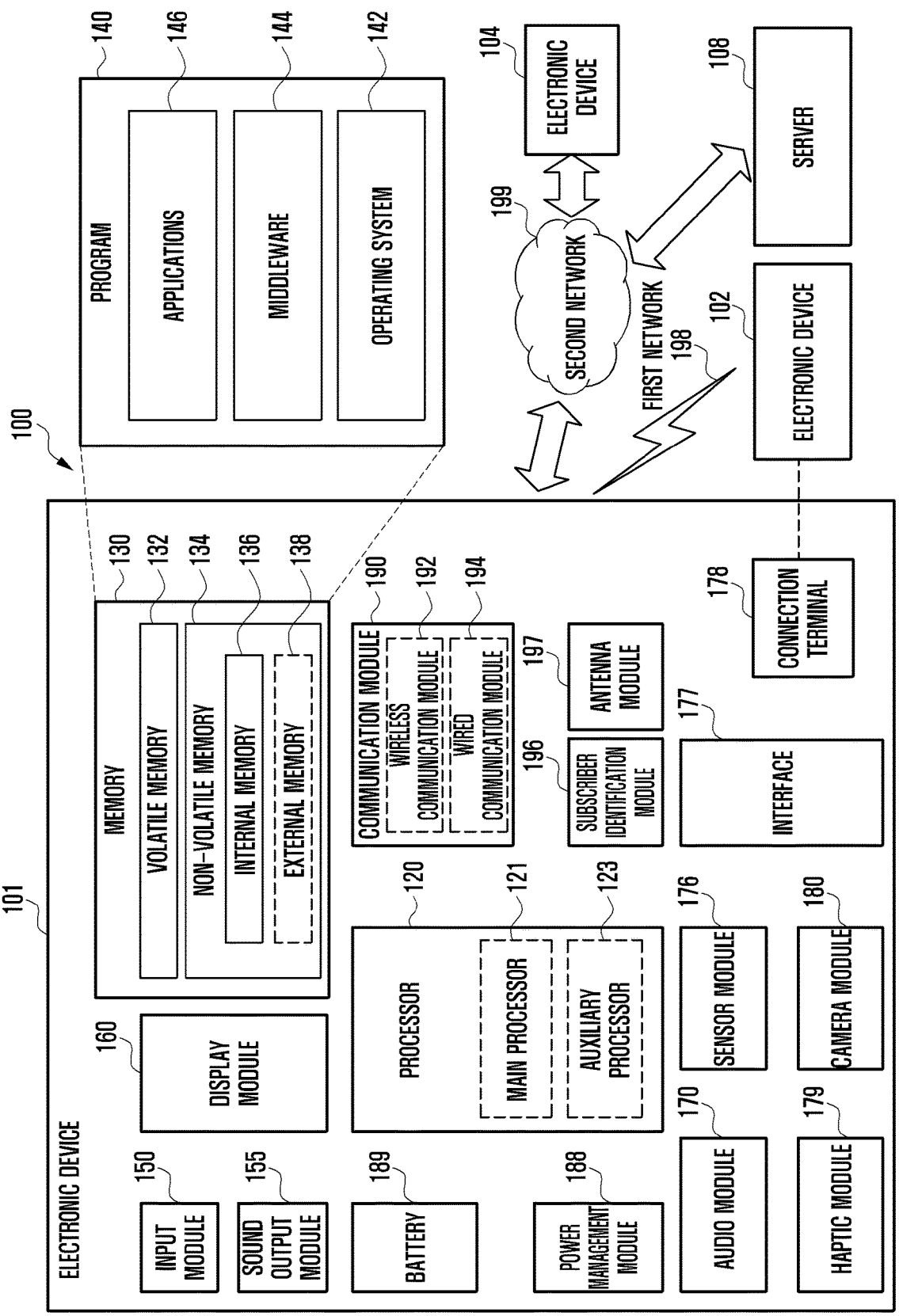
FIG. 1 is a block diagram of an electronic device in a network environment according to an embodiment of the disclosure.

FIG. 1 illustrates an electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consumeless power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via histactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
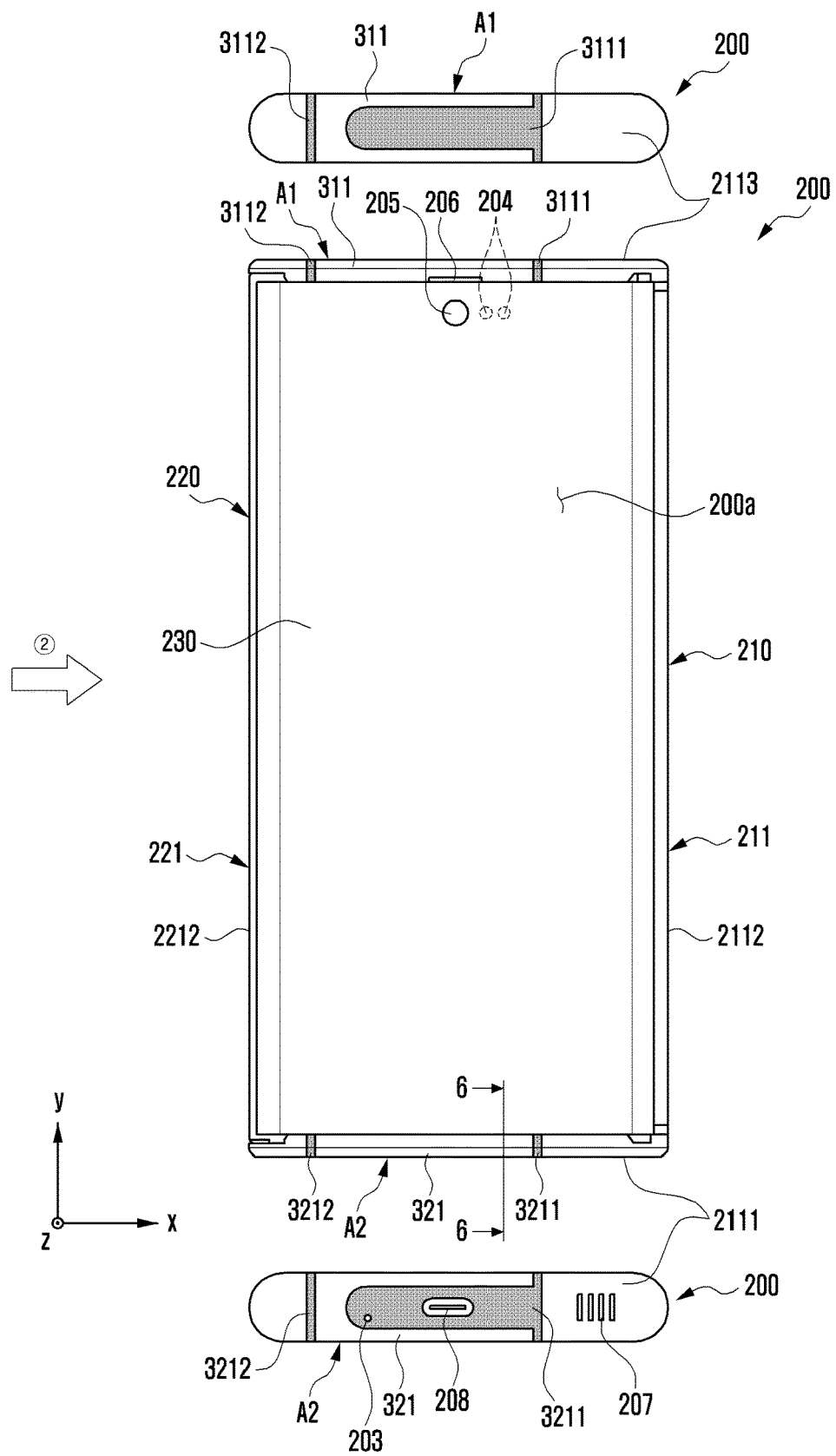
FIGS. 2A and 2B illustrate front and rear views of an electronic device in a slide-in state according to various embodiments of the disclosure.
Figure 2B:
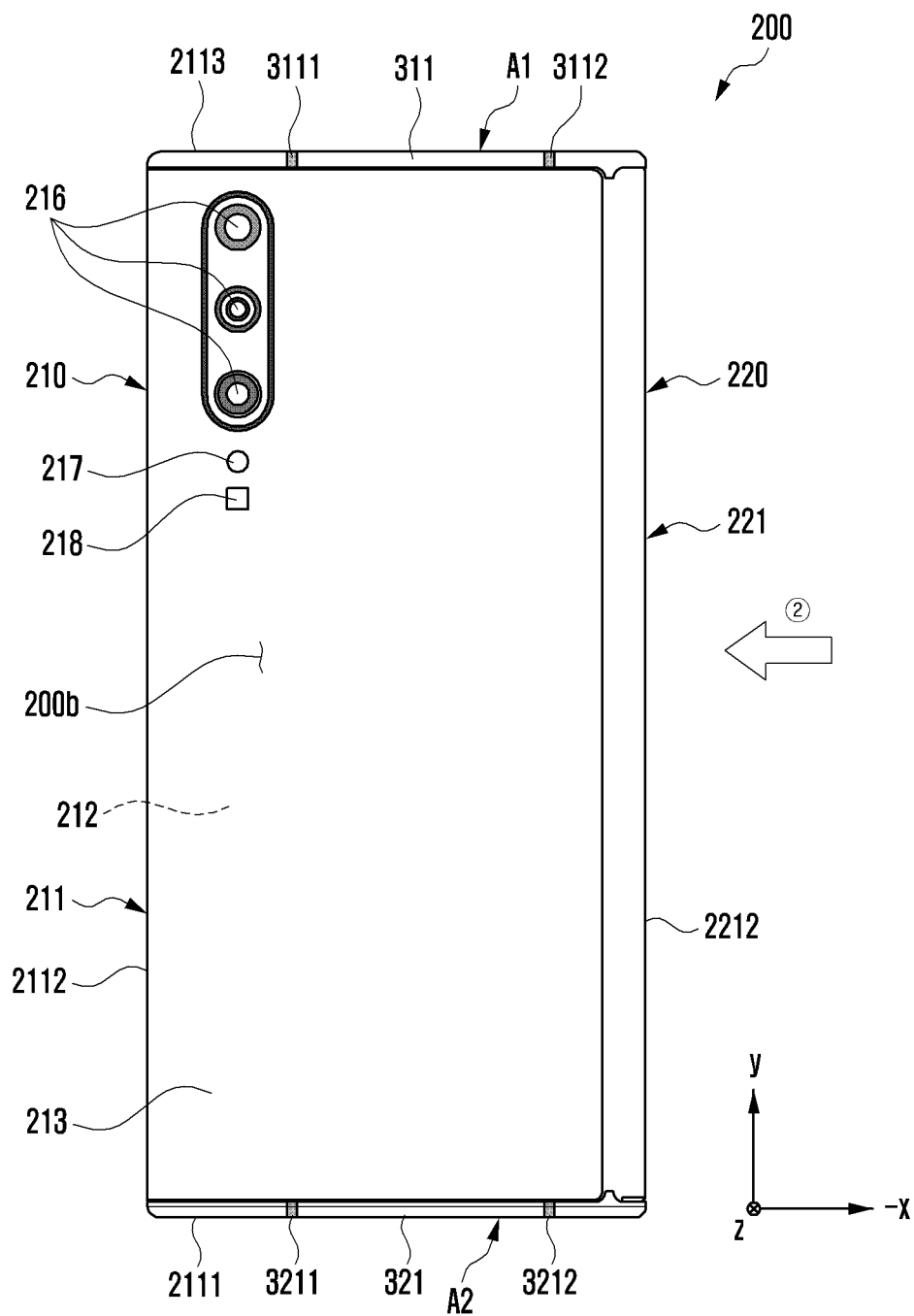
Figure 3A:
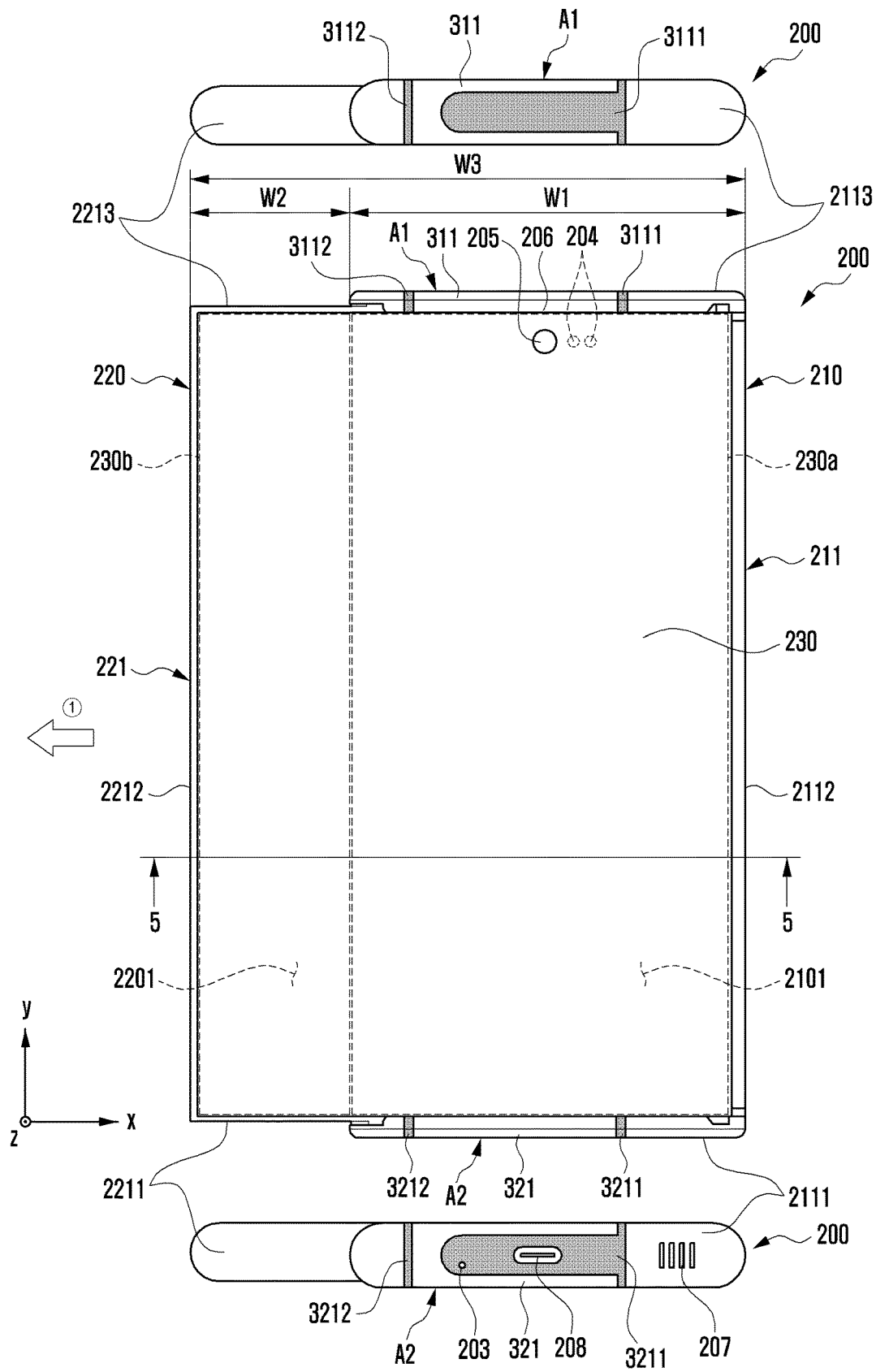
FIGS. 3A and 3B illustrate front and rear views of an electronic device in a slide-out state according to various embodiments of the disclosure.
Figure 3B:
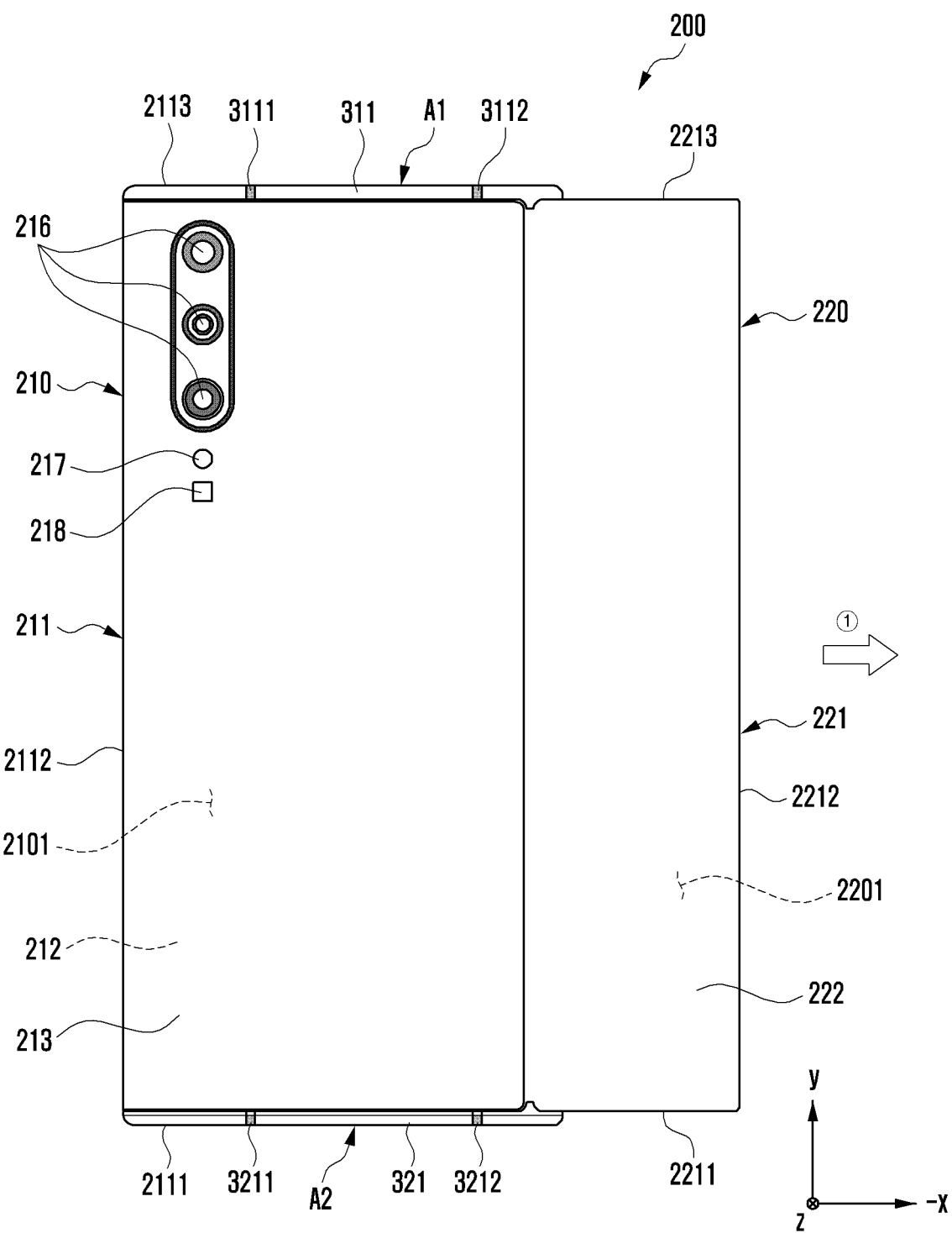

FIGS. 2A and 2B illustrate front and rear views of an electronic device in a slide-in state according to various embodiments of the disclosure, and FIGS. 3A and 3B illustrate front and rear views of an electronic device in a slide-out state according to various embodiments of the disclosure.

An electronic device 200 of FIGS. 2A to 3B may be at least partially similar to the electronic device 101 of FIG. 1, or may further include other embodiments of an electronic device.

Referring to FIGS. 2A to 3B, the electronic device 200 may include a first housing 210 (e.g., first housing structure or base housing), a second housing 220 (e.g., second housing structure or slide housing) coupled to be movable within a predetermined distance and in a predetermined direction (e.g., x axis direction) from the first housing 210, and a flexible display 230 (e.g., expandable display or stretchable display) disposed to be supported by at least a portion of the first housing 210 and the second housing 220. According to one embodiment, at least a portion of the second housing 220 may be received in a first space 2101 of the first housing 210, thereby transitioning to a slide-in state. According to one embodiment, the electronic device 200 may include a bendable member or a bendable support member (e.g., the bendable member 240 of FIG. 5) (e.g., articulated hinge module or a multi-bar assembly) at least partially forming the same plane as at least a portion of the first housing 210 in a slide-out state and at least particularly received in a second space 2201 of the second housing 220 in a slide-in state. According to one embodiment, at least a portion of the flexible display 230 may be received in an inner space 2201 of the second housing 220 while being supported by the bendable member (e.g., the bendable member 240 of FIG. 5), so as to be disposed to be invisible from the outside in the slide-in state. According to one embodiment, at least a portion of the flexible display 230 may be disposed to be visible from the outside in the slide-out state while being supported by the bendable member (e.g., the bendable member 240 of FIG. 5) forming at least partially the same plane as the first housing 210.

According to various embodiments, the electronic device 200 may include a front surface 200*a* (e.g., first surface), a rear surface 200*b* (e.g., second surface) facing a direction opposite to the front surface 200*a*, a side surface (not shown) surrounding a space between the front surface 200*a* and the rear surfaces 200*b*. According to one embodiment, the electronic device 200 may include a first housing 210 including a first side member 211, and a second housing 220 including a second side member 221. According to one embodiment, the first side member 211 may include a first side surface 2111 having a first length along a first direction (e.g., x axis direction), a second side surface 2112 extending from the first side surface 2111 in a direction (e.g., y axis direction) substantially perpendicular thereto so as to have a second length longer than the first length, and a third side surface 2113 extending from the second side surface 2112 to be substantially parallel to the first side surface 2111 and having the first length. According to one embodiment, the first side member 211 may be at least partially formed of a conductive material (e.g., metal). According to one embodiment, at least a portion of the first side member 211 may include a first support member 212 extending up to at least a portion of the first space 2101 of the first housing 210.

According to various embodiments, the second side member 221 may include a fourth side surface 2211 at least partially corresponding to the first side surface 2111 and having a third length, a fifth side surface 2212 extending from the fourth side surface 2211 in a direction substantially parallel to the second side surface 2112 and having a fourth length longer than the third length, and a sixth side surface 2213 extending from the fifth side surface 2212 to correspond to the third side surface 2113 and having the third length. According to one embodiment, the second side member 221 may be at least partially formed of a conductive material (e.g., metal). According to one embodiment, at least a portion of the second side member 221 may include a second support member 222 extending up to at least a portion of the second space 2201 of the second housing 220. According to one embodiment, the first side surface 2111 and the fourth side surface 2211 may be slidably coupled to the third side surface 2113 and the sixth side surface 2213, respectively. According to one embodiment, in the slide-in state, the fourth side surface 2211 may overlap the first side surface 2111 to be substantially invisible from the outside. According to one embodiment, in the slide-in state, the sixth side surface 2213 may overlap the third side surface 2113 to be substantially invisible from the outside. In an embodiment, at least a portion of the fourth side surface 2211 and at least a portion of the sixth side surface 2213 may be arranged to be at least partially visible from the outside in the slide-in state. According to an embodiment, in the slide-in state, the second support member 222 may overlap the first support member 212 to be substantially invisible from the outside. In an embodiment, a portion of the second support member 222 may overlap the first support member 212 in the slide-in state to be invisible from the outside, and the remaining portion of the second support member 222 may be visible from the outside. According to one embodiment, the electronic device may include a rear cover 213 disposed on the rear surface 200*b* and placed in at least a portion of the first housing 210. According to one embodiment, the rear cover 213 may be disposed through at least a portion of the first support member 212. In an embodiment, the rear cover 213 may be integrally formed with the first side member 211. According to one embodiment, the rear cover 213 may be formed of a polymer, coated or colored glass, ceramic, metal (e.g., aluminum, stainless steel (STS) or magnesium), or a combination of at least two of the above materials. In an embodiment, the rear cover 213 may extend up to at least a portion of the first side member 211. In an embodiment, at least a portion of the first support member 212 may be replaced by the rear cover 213. In an embodiment, in connection with the second housing 220, the electronic device 200 may include another rear cover (e.g., second rear cover) disposed on at least a portion of the second support member 222 or replacing at least a portion of the second support member 222.

According to various embodiments, the electronic device 200 may include a flexible display 230 disposed to be supported by at least a portion of the second housing 220 and the first housing 210. According to one embodiment, the flexible display 230 may include a first portion 230a (e.g., flat portion) which is always visible from the outside, and a second portion 230b (e.g., bendable portion) extending from the first portion 230a and at least partially received in the second space 2201 of the second housing 220 to be invisible from the outside in the slide-in state. According to one embodiment, the first portion 230a may be disposed to be supported by the first housing 210, and the second portion 230b may be disposed to be at least partially supported by the bendable member (e.g., the bendable member 240 of FIG. 5). According to one embodiment, in a state in which the second housing 220 is slid out along a predetermined direction (direction □), the flexible display 230 may extend from the first portion 230a while being supported by the bendable member (e.g., the bendable member 240 of FIG. 5), may form substantially the same plane as the first portion 230a, and may be disposed to be visible from the outside. According to one embodiment, in a state in which the second housing 220 is slid in along a predetermined direction (direction □), the second portion 230b of the flexible display 230 may be received in the second space 2201 of the second housing 220 and may be disposed to be invisible from the outside. Accordingly, the electronic device 200 may allow a display area of the flexible display 230 to vary as the second housing 220 slides from the first housing 210 in a predetermined direction (e.g., x axis direction).

According to various embodiments, the first housing 210 and the second housing 220 may be operated with respect to each other in a sliding manner so that the entire length is variable. According to one embodiment, the electronic device 200 in the slide-in state may be configured to have a first width (W1) from the second side surface 2112 to the fifth side surface 2212. According to one embodiment, in the slide-out state, at least a portion of the bendable member (e.g., the bendable member 240 of FIG. 5) received in the second space 2201 of the second housing 220 may move to form an additional second width (W2) and thus the electronic device 200 may be configured to have a third width (W3) greater than the first width (W1). For example, the flexible display 400 may have a display area substantially corresponding to the first width (W1) in the slide-in state, and an expanded display area substantially corresponding to the third width (W3) in the slide-out state.

According to various embodiments, the operation of sliding out the electronic device 200 may be performed through a user's manipulation. For example, the second housing 220 may also be slid out in a predetermined direction (direction □) through manipulation of a locker (e.g., withdrawal button) (not shown) exposed through the rear surface 200b of the electronic device. In this case, the locker may be disposed in the first housing 210 and may fix the second housing 220 such that the second housing 220 which is always pressed in the slide-out direction (direction □) through a support assembly (e.g., the support assembly 260 of FIG. 4) is retained in the slide-in state. In an embodiment, the electronic device 200 may be transitioned to the slide-out state from the slide-in state through a user's manipulation of pressing the outer surface of the flexible display 230 in a predetermined direction (direction □). In an embodiment, the second housing 220 may be automatically operated through a driving mechanism (e.g., driving motor, decelerating module and/or gear assembly) disposed in the first space 2101 of the first housing 210 and/or the second space 2201 of the second housing 220. According to one embodiment, the electronic device 200 may be configured such that the operation of the second housing 220 is controlled through the driving mechanism when an event for changing the slide-in/slide-out state of the electronic device 200 is detected through a processor (e.g., the processor 120 of FIG. 1). In an embodiment, the processor (e.g., the processor 120 of FIG. 1) of the electronic device 200 may control the flexible display 230 such that an object is displayed in various manner and an application program is executed, in response to the display area of the flexible display 230 changing according to a slide-in state, a slide-out state, or an intermediate state (e.g., including a free stop state).

According to various embodiments, the electronic device 200 may include at least one of an input device 203, sound output devices 206 and 207, sensor modules 204 and 217, camera modules 205 and 216, a connector port 208, a key input device (not shown), or an indicator (not shown), which are disposed in the first space 2101 of the first housing 210. In another embodiment, the electronic device 200 may be configured such that at least one of the above-described elements is omitted or other elements are additionally included. In another embodiment, at least one of the above-described elements may be disposed in the second space 2201 of the second housing 220.

According to various embodiments, the input device 203 may include a microphone. In an embodiment, the input device 203 may include a plurality of microphones arranged to sense the direction of sound. The sound output devices 206 and 207 may include a speaker. For example, the sound output devices 206 and 207 may include a call receiver 206 and an external speaker 207. According to one embodiment, the external speaker 207 may face outside in the slide-out state through at least one speaker hole formed through the first housing 210. According to one embodiment, the connector port 208 may face outside in the slide-out state through a connector port hole formed through the first housing 210. According to one embodiment, the call receiver 206 may also include a speaker (e.g., piezo speaker) operated without a separate speaker hole.

According to various embodiments, the sensor modules 204 and 217 may generate an electrical signal or data value corresponding to an internal operating state or an external environmental state of the electronic device 200. The sensor modules 204 and 217 are, for example, may include a first sensor module 204 (e.g., proximity sensor or illuminance sensor) disposed on the front surface 200a of the electronic device 200 and/or a second sensor module 217 (e.g., heart rate monitoring (HRM) sensor) disposed on the rear surface 200b of the electronic device 200. According to one embodiment, the first sensor module 204 may be disposed under the flexible display 230 of the front surface 200a of the electronic device 200. According to one embodiment, the first sensor module 204 and/or the second sensor module 217 may include at least one of a proximity sensor, an illuminance sensor, a time of flight (TOF) sensor, an ultrasonic sensor, a fingerprint recognition sensor, a gesture sensor, a gyro sensor, a barometric pressure sensor, a magnetic sensor, an acceleration sensor, a grip sensor, a color sensor, an infrared (IR) sensor, a biometric sensor, a temperature sensor, or a humidity sensor.

According to various embodiments, the camera modules 205 and 216 may include a first camera module 205 disposed on the front surface 200a of the electronic device 200, and a second camera module 216 disposed on the rear surface 200b of the electronic device 200. According to one embodiment, the electronic device 200 may include a flash 218 positioned near the second camera module 216. According to one embodiment, the camera modules 205 and 216 may include one or more lenses, an image sensor, and/or an image signal processor. According to one embodiment, the first camera module 205 may be disposed under the flexible display 230 and may be configured to photograph a subject through a portion of the active area of the flexible display 230. According to one embodiment, the flash 218 may include, for example, a light emitting diode or a xenon lamp.

According to various embodiments, the first camera module 205 of the camera modules 205 and 216 and the sensor module 204 of the sensor modules 204 and 217 may be arranged to detect an external environment through the flexible display 230. For example, in the first space 2101 of the first housing 210, the first camera module 205 or the sensor module 204 may be arranged to communicate with the external environment through a transparent region or a perforated opening formed on the flexible display 230. According to one embodiment, the region facing the first camera module 205 of the flexible display 230 may be formed as a transmission region having a predetermined transmittance as a part of a region for displaying content. According to one embodiment, the transmission region may be formed to have a transmittance in a range of about 5% to about 20%. Such a transmission region may include a region overlapping with an effective region (e.g., field of view) of the first camera module 205, through which light for generating an image formed by an image sensor passes. For example, the transmission region of the flexible display 230 may include a region having a pixel density and/or a wiring density lower than the periphery thereof. For example, the transmission region may replace the above-described opening. For example, the first camera module 205 may include an underdisplay camera (UDC). In an embodiment, the sensor module 204 may be disposed in the inner space of the electronic device 200 to perform a function thereof without being visually exposed through the flexible display 230.

According to various embodiments, the electronic device 200 may include one or more antennas A1 and A2 electrically connected to a wireless communication circuit (e.g., the wireless communication module 192 of FIG. 1) disposed in the first space 2101 of the first housing 210. According to one embodiment, the one or more antennas A1 and A2 may include a first antenna A1 disposed in the upper side region of the electronic device 200, and a second antenna A2 disposed in the lower side region of the electronic device 200. In an embodiment, the electronic device may also further include at least one additional antenna disposed on the second side surface of the first housing and/or the fifth side surface of the second housing. According to one embodiment, the first antenna A1 on the third side surface 2113 of the first side member 211 may include a first conductive portion 311 segmented through at least one non-conductive portion 3111 and 3112. According to one embodiment, the first conductive portion 311 may be disposed to be segmented through the first non-conductive portion 3111 and the second non-conductive portion 3112 spaced apart from each other at a predetermined interval and may be electrically connected to a wireless communication circuit (e.g., the wireless communication module 192 of FIG. 1). According to one embodiment, the second antenna A2 on the first side surface 2111 of the first side member 211 may include a second conductive portion 321 segmented through at least one non-conductive portion 3211 and 3212. According to one embodiment, the second conductive portion 321 may be disposed to be segmented through the third non-conductive portion 3211 and the fourth non-conductive portion 3212 spaced apart from each other at a predetermined interval and may be electrically connected to a wireless communication circuit (e.g., the wireless communication module 192 of FIG. 1). According to one embodiment, the wireless communication circuit (e.g., the wireless communication module 192 of FIG. 1) may be configured to transmit and/or receive a wireless signal in a predetermined frequency band (e.g., about 800 MHz-6000 MHz) through the first conductive portion 311 and/or the second conductive portion 312. In an embodiment, the electronic device may further include at least one antenna module (e.g., 5G antenna module or an antenna structure) arranged in the inner space thereof and configured to transmit and receives a wireless signal in a frequency band of about 3 GHz-100 GHz through another wireless communication circuit (e.g., the wireless communication module 192 of FIG. 1).

In various embodiments of the disclosure, a lifting prevention structure for intercepting a force generated when the flexible display 230 is unfolded may be provided to a region where the flexible display is bent during the operation of sliding in/out the electronic device 200. According to one embodiment, this lifting prevention structure may allow the flexible display 230 to be in close contact with the second housing 220 during operation, thereby advantageously improving the surface quality of the flexible display 230. This lifting prevention structure may include an improved structure for improving assembly.

Figure 4:
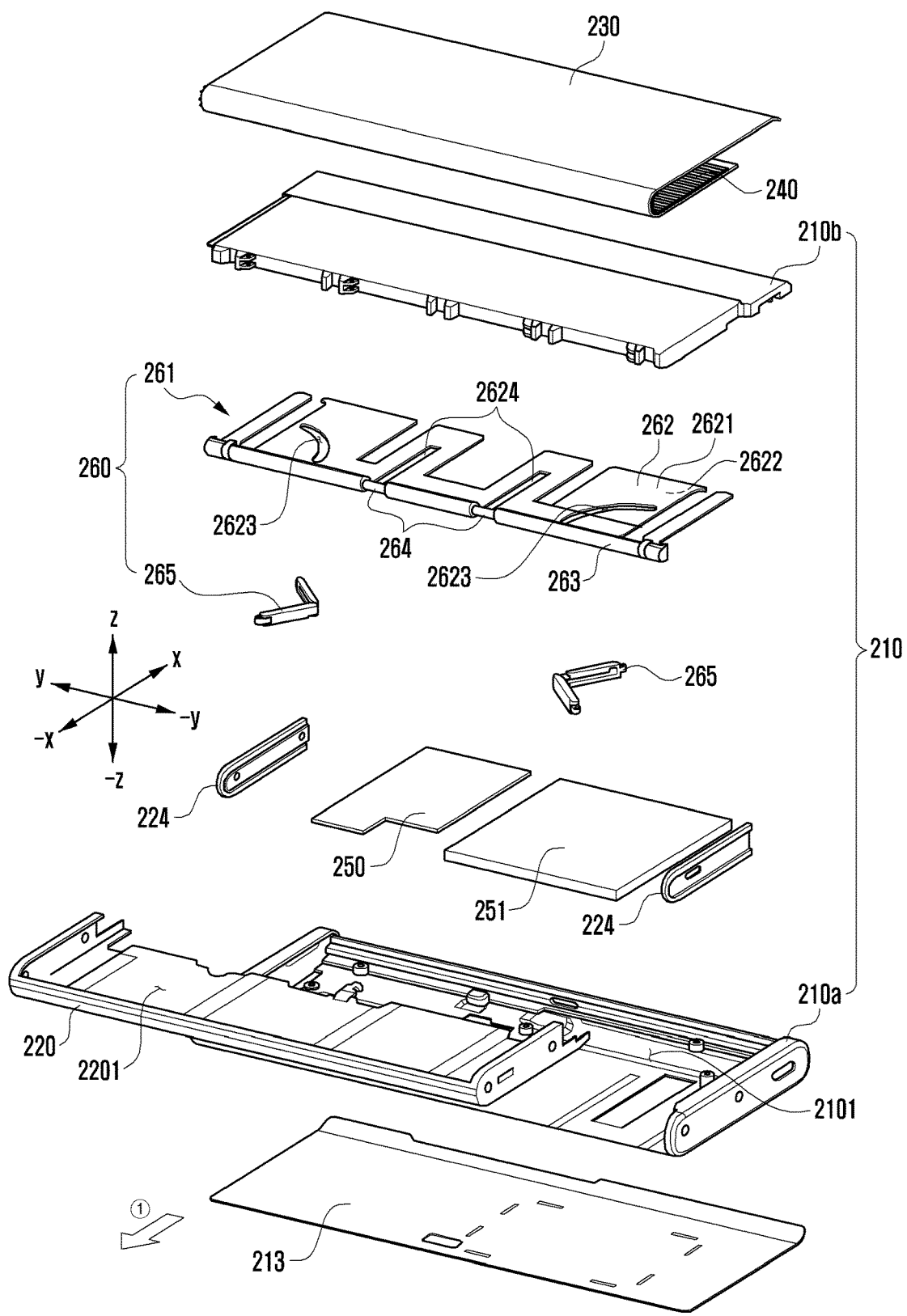
FIG. 4 is an exploded perspective view of an electronic device according to an embodiment of the disclosure.

FIG. 4 is an exploded perspective view of an electronic device according to an embodiment of the disclosure.

Figure 5:
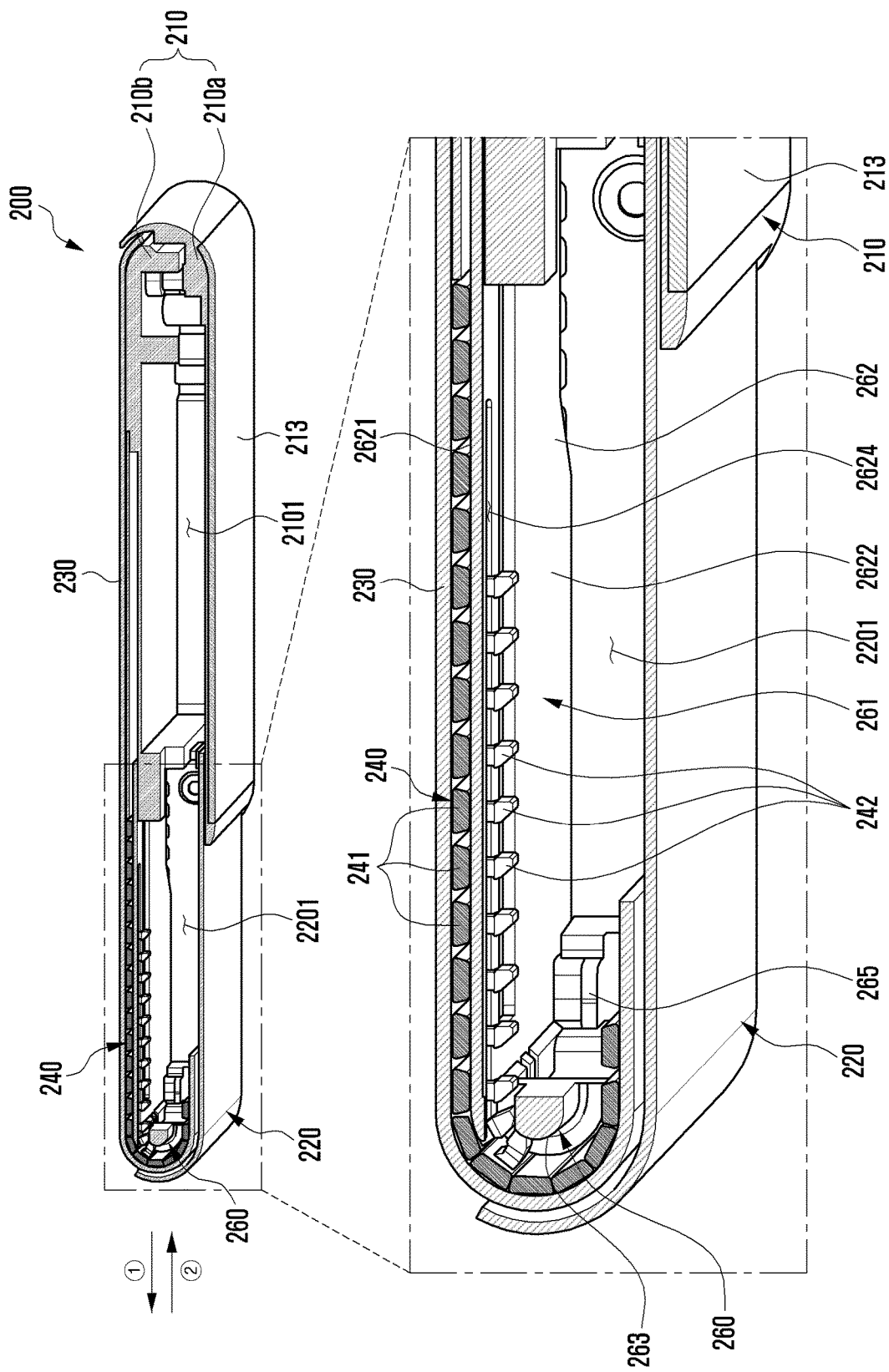
FIG. 5 is a cross-sectional view of an electronic device taken along line 5-5 of FIG. 3A according to an embodiment of the disclosure.

FIG. 5 is a cross-sectional view of an electronic device taken along line 5-5 of FIG. 3A according to an embodiment of the disclosure.

Referring to FIGS. 4 and 5, the electronic device 200 may include a first housing 210 including a first space 2101, a second housing 220 slidably coupled to the first housing 210 and including a second space 2201, a bendable member 240 at least partially rotatably disposed in the second space 2201, and a flexible display 230 disposed to be supported by the first housing 210 and at least a portion of the bendable member 240. According to one embodiment, the first space 2101 of the first housing 210 may be provided through the coupling of a first bracket housing 210a and a second bracket housing 210b. In an embodiment, at least a portion of the first bracket housing 210a may include a first support member (e.g., the first support member 212 of FIG. 3B) or may be replaced by the first support member 212. According to one embodiment, the electronic device 200 may include a substrate 250 disposed in the first space 2101, and a battery 251 disposed near the substrate 250. According to one embodiment, the electronic device 200 may include a camera module (e.g., the camera module 216 of FIG. 3A) or a sensor module (e.g., the sensor module 217 of FIG. 3A) disposed in the first space 2101. According to one embodiment, the bendable member 240 may be arranged such that one end thereof is fixed to the first housing 210 and the other end thereof is arranged to be received to be at least partially movable in the second space 2201 of the second housing 220. For example, the bendable member 240 may be at least partially received in the second space 2201 in the slide-in state and may be at least partially slid out from the second space 2201 to form substantially the same plane as the first housing 210 (e.g., the second bracket housing 210b) in the slide-out state. Accordingly, the flexible display 230 supported by at least a portion of the bendable member 240 and the first housing 210 may have a display area visible from the outside, which is variable according to a sliding operation. According to one embodiment, the electronic device 200 may include at least one guide rail 224 disposed between the first housing 210 and the second housing 220 and configured to induce a sliding operation of the second housing 220. In an embodiment, the electronic device 200 may further include cover members (not shown) disposed to cover opposite side surfaces (e.g., the first side surface 2111 of FIG. 2A and the third side surface 2113 of FIG. 2A) of the first housing 210.

According to various embodiments, the electronic device 200 may include a support assembly 260 disposed to be at least partially movable from the first housing 210 to the second space (e.g., the second space 2201 of FIG. 5) direction (direction ☐) and configured to press the second housing 220 in a direction in which the same is slid out. According to one embodiment, the support assembly 260 may include a support plate 261 slidably coupled to the first housing 210 (e.g., the second bracket housing 210b), and at least one pressing link 265 that is disposed to be supported by the first housing 210 (e.g., the second bracket housing 210b) and presses the support plate 261 in a direction in which the same is slid out (direction ☐). According to one embodiment, the at least one pressing link 265 may include at least two unit links connected to be separated through an elastic member (e.g., torsion spring), and a pressing force for pressing the support plate in the slide-out direction (e.g., −x axis direction) may be formed to provide through the force formed by the unit links which are separated from each other.

According to various embodiments, the support plate 261 may include a plate part 262, and a pressing part 263 extending from an end portion of the plate part 262 to have substantially the same length as the support plate 261 in the longitudinal direction thereof (e.g., y axis direction), the plate part 262 including a first surface 2621 that is slidably coupled to the first housing 210 and faces a predetermined direction (e.g., z axis direction), and a second surface 2622 facing in a direction (e.g., −z axis direction) opposite to the first surface 2621. According to one embodiment, the pressing part 263 may be formed in a shape in which frictional force is minimized, in order to press the rear surface of the bendable member 240. For example, the outer surface of the pressing part 263 may be formed to have a curved surface. In an embodiment, the pressing part 263 may be formed as a separate component to be structurally coupled to the plate part 262. According to one embodiment, the plate part 262 may include a link guide 2623 formed to guide the at least one pressing link 265. According to one embodiment, the at least one pressing link 265 may provide a pressing force for always pressing the second housing 220 in the slide-out direction (direction ☐) and may support the bendable member 240 during operation, thereby advantageously reducing the drooping phenomenon of the flexible display 230. According to one embodiment, the support plate 262 may be coupled to the second housing 220, thereby contributing to the formation of the second space 2201. In an embodiment, the support plate 262 may also be replaced by a part of the second housing 220.

According to various embodiments, the electronic device 200 may have a lifting prevention structure for inducing the bendable member 240 to move while in close contact with a first surface 2621 of the plate part 262 of the support plate 261. According to one embodiment, the lifting prevention structure may be disposed through at least a portion of the support assembly 260. According to one embodiment, the lifting prevention structure may include a plurality of engaging protrusions 242 protruding from the rear surface of the bendable member 240 at a predetermined interval, and one or more guide slits 2624 having a length formed in the plate part 262 of the support plate 261 so that the plurality of engaging protrusions 242 can be engaged therewith. According to one embodiment, the plurality of engaging protrusions 242 may be formed to have a predetermined interval along the slide-in direction (direction ☐) and the slide-out direction (direction ☐) of the electronic device 200. According to one embodiment, the one or more guide slits 2624 may also be formed to have a length along the slide-in direction (direction ☐) and the slide-out direction (direction ☐) of the electronic device 200. According to one embodiment, the bendable member 240 may include a plurality of multi-bars 241 coupled to be rotatable with respect to each other. According to one embodiment, the plurality of engaging protrusions 242 may be protrude respectively from the plurality of multi-bars 241 into the second space 2201 or be coupled thereto.

According to various embodiments, at least a portion of the flexible display 230 may be fixed to the bendable member 240 through an attachment method, such as bonding and/or taping. According to one embodiment, the bendable member 240 to which the at least a portion of the flexible display 230 is attached may be disposed on the first surface 2621 of the plate part 262 of the support plate 261 and at least a portion of the outer surface of the pressing part 263 in a manner of being substantially in close contact therewith and may be received in the second space 2201 of the second housing 220 together with the flexible display 230 in the slide-in state according to the sliding operation of the support plate 261. According to one embodiment, the plurality of engaging protrusions 242 disposed on the bendable member 240 may be guided along the guide slits 2624 formed through the plate part 262 of the support plate 261 according to the sliding operation of the support plate 261. In this case, since the plurality of engaging protrusions 242 may not escape from the guide slits 2624 through the engaging structure (e.g., hook structure or protrusion structure), a phenomenon in which the bendable member 240 is lifted from the support plate 261 may be prevented in the bent region of the flexible display 230. In an embodiment, a contact portion of the plate part 262 and/or the plurality of engaging protrusions 242 may further include a friction reducing coating layer (e.g., Teflon coating layer or hard coating layer) in order to reduce frictional force between the contact portion (e.g., the second surface 2622) of the plate part 262 and the plurality of engaging protrusions 242.

Figure 6:
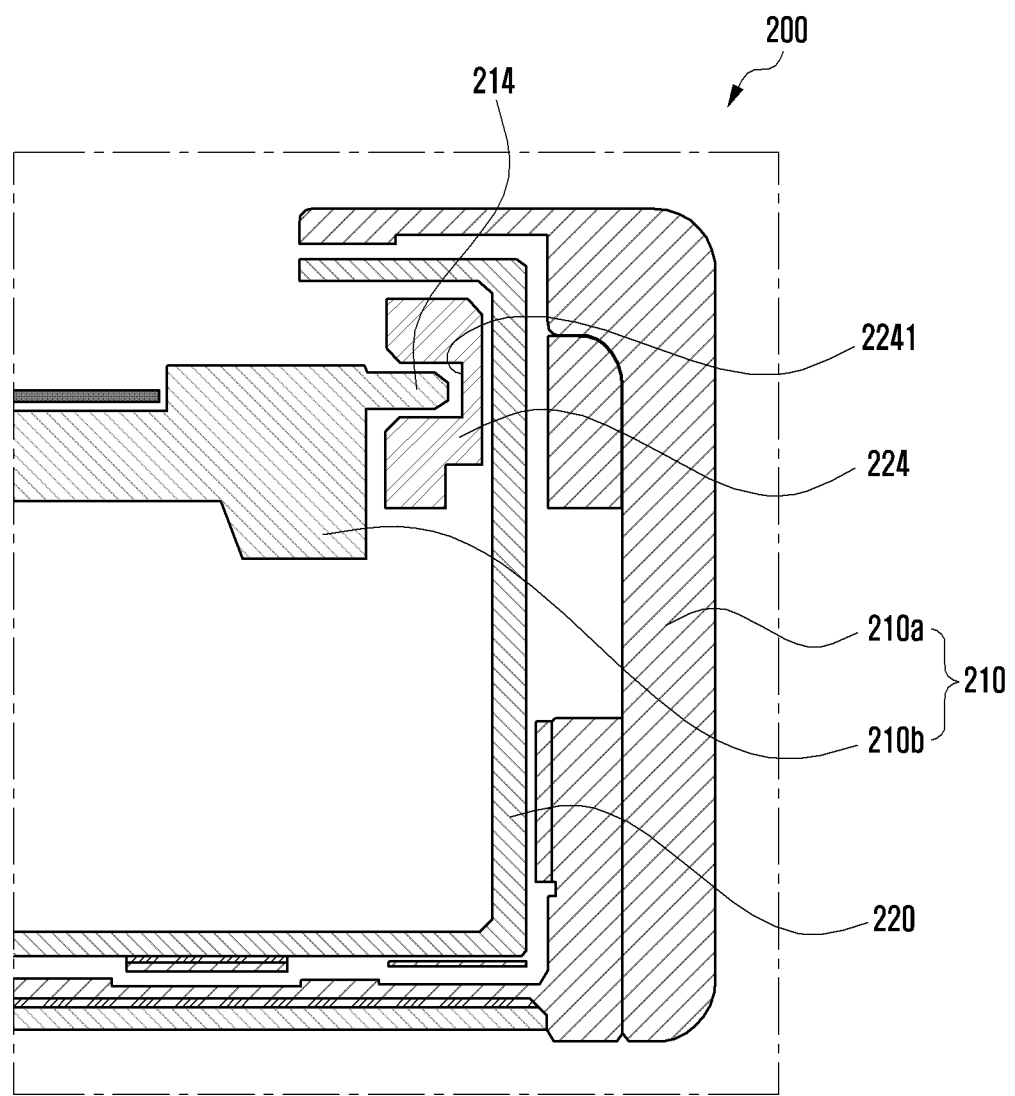
FIG. 6 is a cross-sectional view of an electronic device taken along line 6-6 of FIG. 2A according to an embodiment of the disclosure.

FIG. 6 is a cross-sectional view of an electronic device taken along line 6-6 of FIG. 2A according to an embodiment of the disclosure.

Referring to FIG. 6, the electronic device 200 may further include a guide structure for guiding the second housing 220 moving from the first housing 210 in a sliding manner According to one embodiment, the guide structure may include a guide rib 214 formed in the second bracket housing 210b of the first housing 210, and a guide groove 2241 formed on the guide rail 224 fixed to the second housing 220 and configured to receive the guide rib 214. According to one embodiment, when the second housing 220 is slidingly moved from the first housing 210, the guide rib 214 may move along the guide groove 2241 of the guide rail 224, thereby advantageously providing stable sliding motion. In an embodiment, the guide groove 2241 may be directly formed on the second housing 220. According to one embodiment, the guide groove 2241 may be formed at each of the opposite ends of the bendable member 240, and may also additionally guide the guide protrusion (e.g., the guide protrusion 243 of FIG. 7A) disposed on substantially the same line as the guide rib 214 in the slide-out state.

Figure 7A:
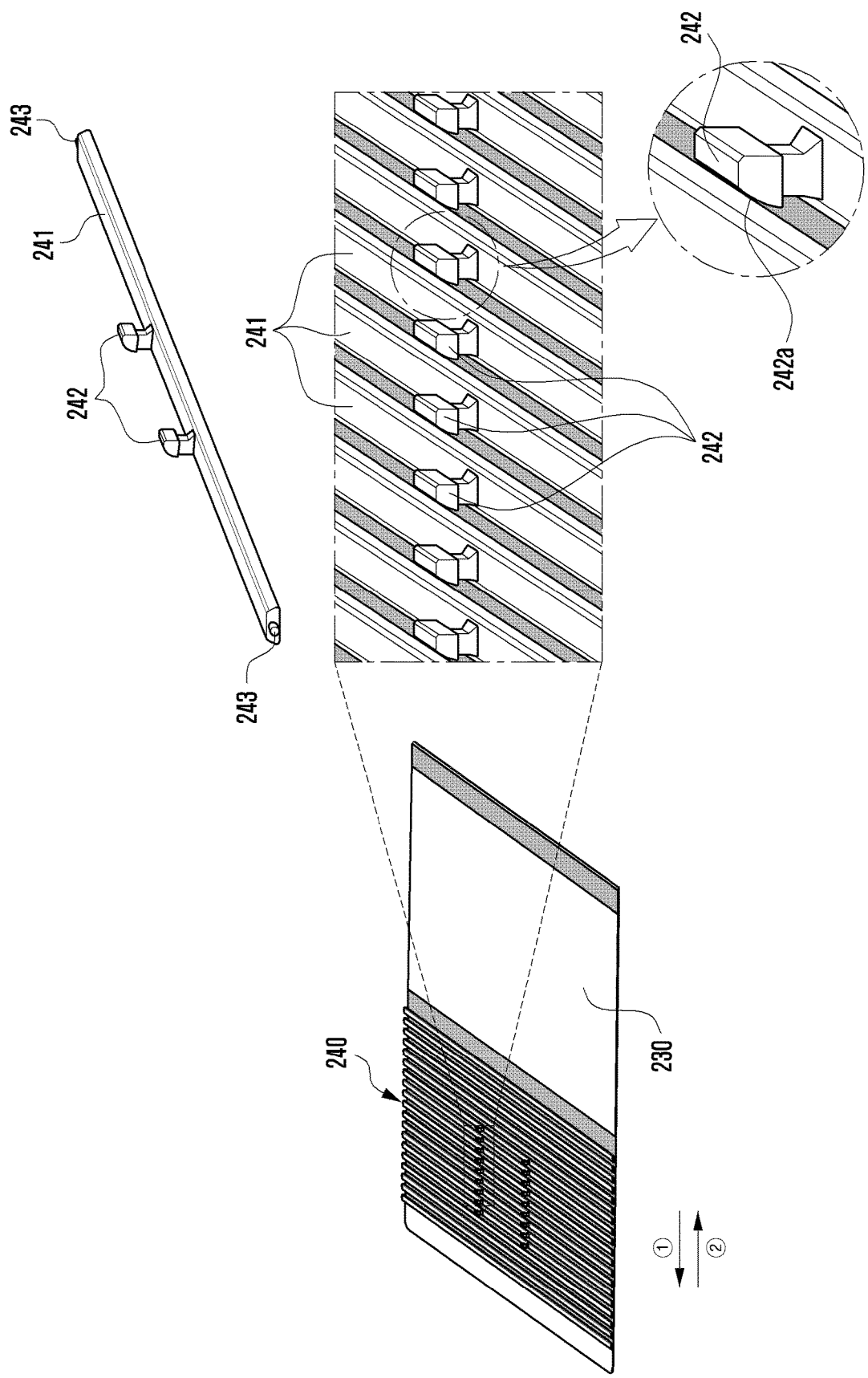
FIGS. 7A and 7B are perspective views of a bendable member according to various embodiments of the disclosure.
Figure 7B:
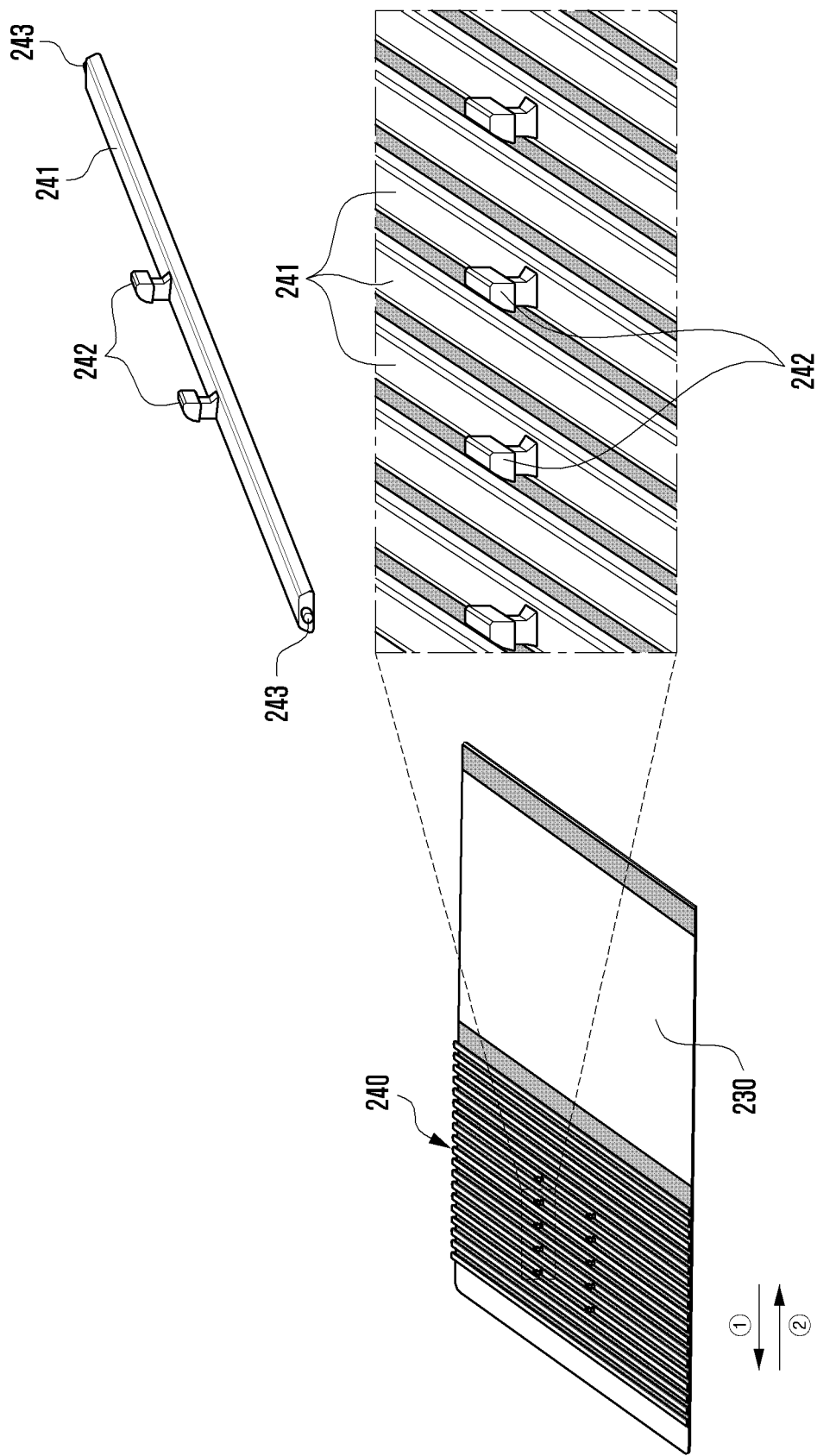

FIGS. 7A and 7B are perspective views of bendable member according to various embodiments of the disclosure.

Referring to FIG. 7A, the bendable member 240 may include a plurality of multi-bars 241 coupled to be rotatable with respect to each other. According to one embodiment, the bendable member 240 may include a plurality of engaging protrusions 242 disposed at a predetermined interval on a surface (e.g., rear surface) opposite to the surface to which the flexible display 230 is attached. According to one embodiment, the plurality of engaging protrusions 242 may be disposed on specific multi-bars 241 among the plurality of multi-bars 241. For example, the plurality of engaging protrusions 242 may be disposed on specific multi-bars 241, based on the variable length of the display area of the flexible display 230. According to another embodiment, the plurality of engaging protrusions 242 may be disposed to correspond to the plurality of multi-bars 241, respectively. According to one embodiment, the plurality of engaging protrusions 242 may be formed to have a predetermined interval along the slide-out (direction □) and the slide-in direction (direction □) of the electronic device 200. According to one embodiment, each of the plurality of engaging protrusions 242 may be formed in an undercut shape (e.g., 'T'-shaped structure). According to one embodiment, the plurality of engaging protrusions 242 may include a tapered inclined surface 242a that gradually becomes thinner as the same are spaced away from the plurality of multi-bars 241 in order to minimize interference with each other when the plurality of multi-bars 241 are bent. For example, each of the plurality of engaging protrusions 242 may be formed in a rhombus shape when viewed from a direction perpendicular to the slide-in/slide-out direction (direction □ and direction □). In an embodiment, the plurality of engaging protrusions 242 may also have an arrangement structure having two or more rows according to the number of corresponding guide slits (e.g., the guide slit 2624 of FIG. 4). According to one embodiment, the plurality of multi-bars 241 and the plurality of engaging protrusions 242 may be formed of a metal material. According to one embodiment, the plurality of multi-bars 241 and the plurality of engaging protrusions 242 may be integrally formed with each other or separately formed to be structurally coupled to each other. In an embodiment, the plurality of multi-bars 241 and/or the plurality of engaging protrusions 242 may be formed of a non-metal material, or may be formed through insert injection using a metal material and an injection material.

Referring to FIG. 7B, the bendable member 240 may be disposed on specific multi-bars 241 to have a predetermined interval in a manner of skipping neighboring one unit multi-bar 241. For example, when the bendable member 240 is bent in the bent region, the plurality of engaging protrusions 242 may be disposed to have a space by which the same do not interfere with each other, according to the bending curvature of the bendable member 240. For example, the plurality of engaging protrusions 242 may be disposed on the multi-bars 241 at a predetermined interval of multiples of 2 or 3 or more. In an embodiment, the plurality of engaging protrusions 242 may also be disposed on the plurality of multi-bars 241 such that an interval therebetween is gradually increased or gradually narrowed. In an embodiment, in consideration of a mounting space of the electronic component to be disposed in the inner space (e.g., the second space 2201 of FIG. 5) of the electronic device 200, the plurality of engaging protrusions 242 may also be disposed on the plurality of multi-bars 241 to have irregular intervals.

Figure 8:
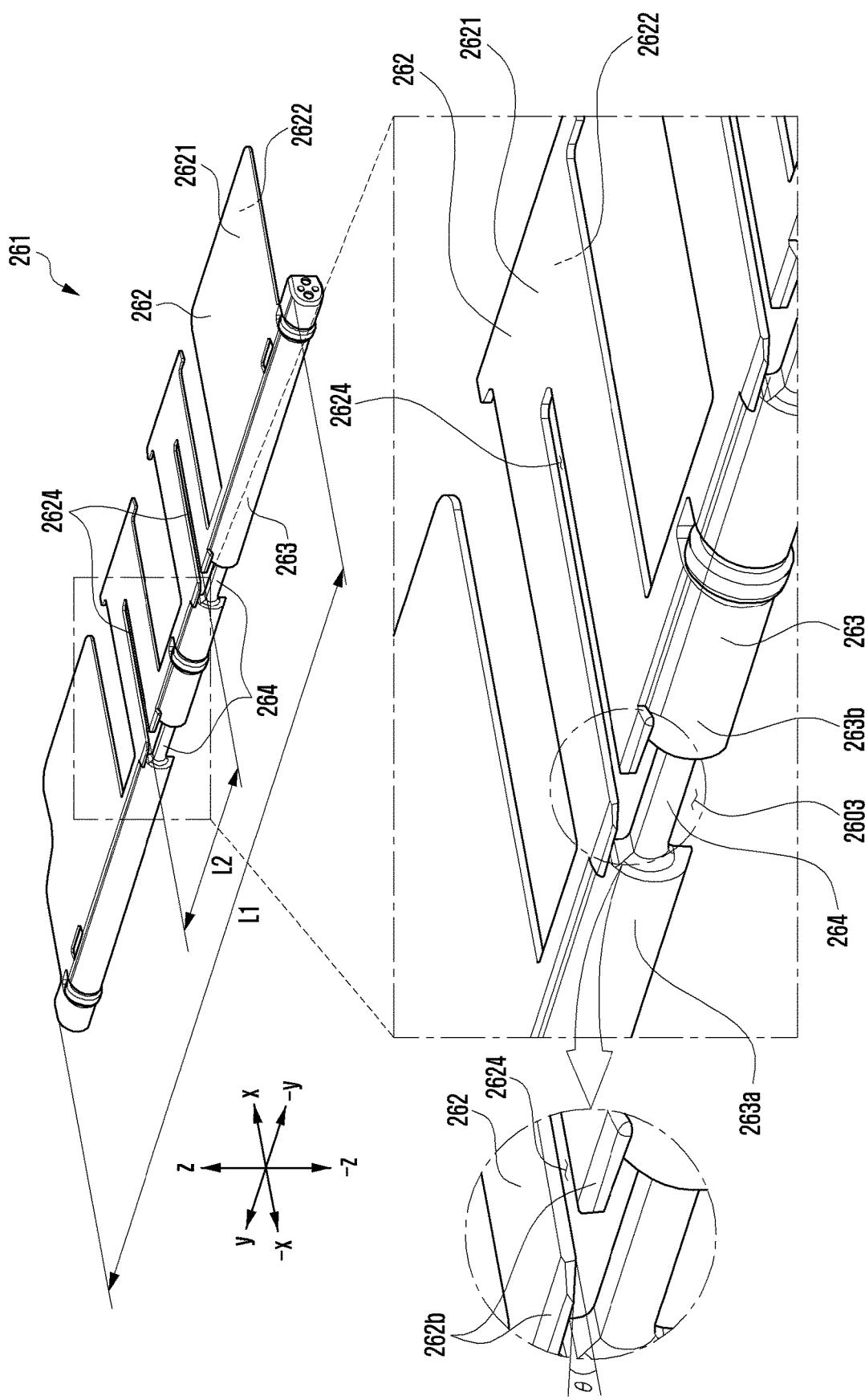
FIG. 8 is a perspective view of a support plate according to an embodiment of the disclosure.

FIG. 8 is a perspective view of a support plate according to an embodiment of the disclosure.

Referring to FIG. 8, the support plate 261 may include a plate part 262 slidably coupled to the first housing (e.g., the first housing 210 of FIG. 4), and a pressing part 263 extending from an end portion of the plate part 262 to have a predetermined length (L1) in the longitudinal direction (e.g., y axis direction) of the support plate 261. According to one embodiment, the pressing part 263 may at least partially have the curved outer surface to minimize frictional force between the bendable member 240 and the pressing part 263. According to one embodiment, the plate part 262 may have a first surface 2621 in a direction (e.g., z axis direction) in which the same faces the bendable member 240, and a second surface 2622a facing a direction (e.g., −z axis direction) opposite to the first surface 2621. According to one embodiment, the support plate 261 may include one or more guide slits 2624 formed through the plate part 262 to have a length in a direction perpendicular (e.g., x axis direction) to the longitudinal direction (e.g., y axis direction) of the support plate 261. According to one embodiment, the one or more guide slits 2624 may be disposed within a range corresponding to a length (L2) occupying about 50% from the center, based on the entire length (L1) of the support plate 261. According to one embodiment, the one or more guide slits 2624 may be located at a portion where the same are symmetrical with respect to each other, based on the center of the entire length (L1) of the support plate 261, or may be located at a predetermined interval with reference to the entire length (L1) of the support plate 261. According to one embodiment, the support plate 261 may be formed of a metal material and/or a non-metal material (e.g., injection molded material).

According to various embodiments, the guide slits 2624 may extend from the pressing part 263 to a predetermined position of the plate part 262. Accordingly, the pressing part 263 may include at least partially segmented first portion 263a and second portion 263b, which are formed left and right with respect to the guide slit 2624, so as to have a predetermined distancing space 2603. According to one embodiment, the distancing space 2603 can advantageously allow the plurality of engaging protrusions 242 of the bendable member 240 to be easily introduced into the guide slits 2624. According to one embodiment, the distancing space 2603 and the guide slits 2624 may cause the support plate 261 to be retained in a partially segmented state, and thus may weaken the rigidity of the electronic device 200. To compensate for this problem, the support plate 261 may include a connection part 264 connecting the first portion 263a and the second portion 263b of the pressing part 263. According to one embodiment, the connection part 264 may be integrally formed with the first portion 263a and the second portion 263b of the pressing part 263. According to one embodiment, the diameter of the connection part 264 may be smaller than the diameter of the pressing part 263. According to one embodiment, the diameter of the connection part 264 may be determined by the size of protrusion of the plurality of engaging protrusions 242 moving through the distancing space 2603 and protruding from the bendable member 240. For example, the diameter of the connection part 264 may be determined to a size, while the electronic device 200 is transitioned from the slide-out state to the slide-in state, allowing the plurality of engaging protrusions 242 to be received in at least a portion of the distancing space 2603 without interfering with movement and capable of maintaining a state in which the bendable member 240 is in close contact with the outer surface of the pressing part 263. According to one embodiment, in the distancing space 2603, an introduction portion 262b of the plate part 262, from which the guide slits 2624 start, may have a chamfer structure having a thickness gradually thinner toward an end portion thereof (e.g., toward −x axis direction) such that the plurality of engaging protrusions 242 are easily introduced into the guide slits 2624. In this case, the introduction portion 262b may have a surface inclined at a predetermined angle (θ) such that the same is parallel to the first surface 2621 and becomes thinner on second surface 2622. In an embodiment, the introduction portion 262b may also be bent a predetermined angle in a downward direction (e.g., −z axis direction). In an embodiment, the introduction portion 262b may form the same plane as the plate part 262. According to one embodiment, the introduction portion 262b may at least partially overlap the connection part 264 when the plate part 262 is viewed from above, thereby advantageously expanding a support area of the flexible display 230 through the plate part 262.

Figure 9:
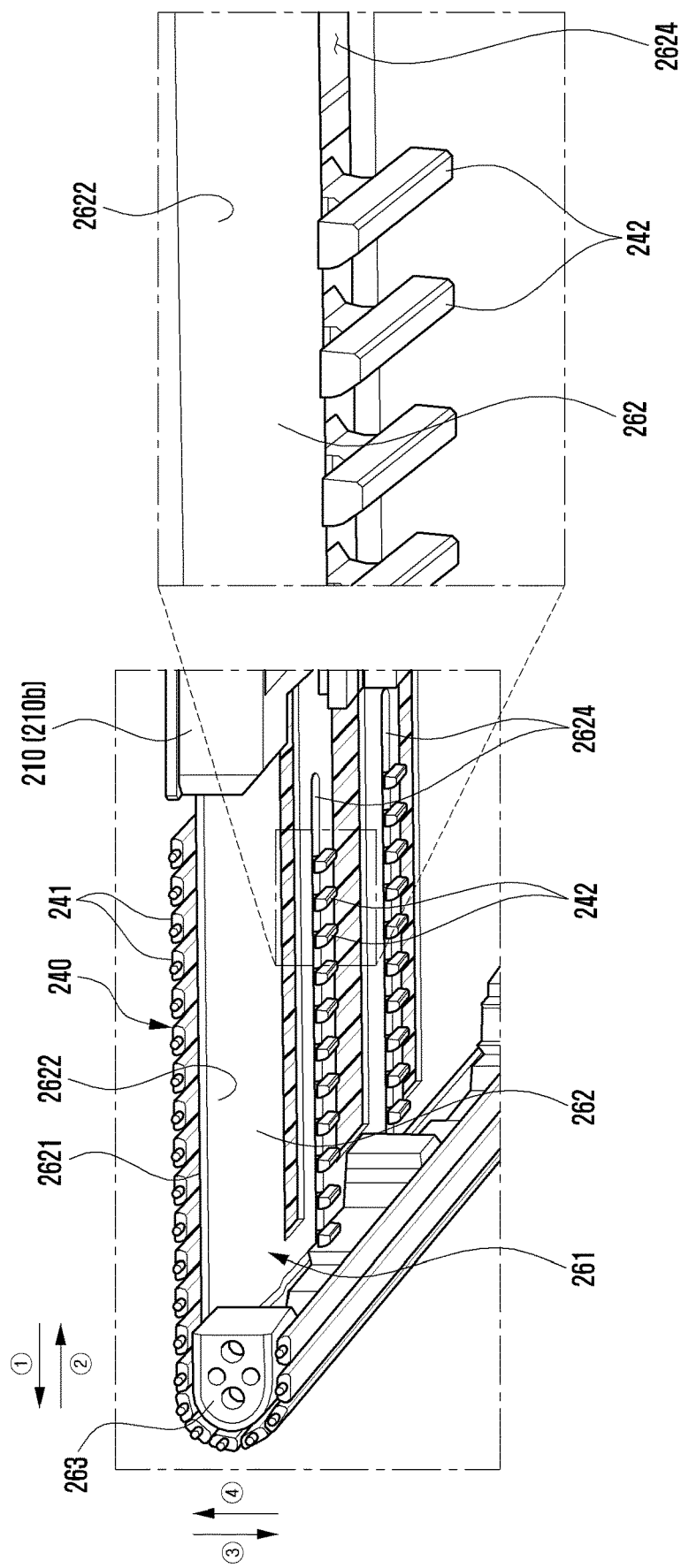
FIG. 9 is a partial perspective view illustrating a state in which a bendable member is assembled to a support plate according to an embodiment of the disclosure.

FIG. 9 is a partial perspective view illustrating a state in which a bendable member is assembled to a support plate according to an embodiment of the disclosure.

Referring to FIG. 9, the plate part 262 of the support plate 261 may be slidably coupled to the second bracket housing 210b of the first housing 210. In this case, at least a portion of the bendable member 240 may be disposed to face the first surface 2621 of the plate part 262 of the support plate 261, and at least other portions of the bendable member may be disposed such that the bent state thereof is maintained while the same are supported by the pressing part 263 of the support plate 261. In this case, one end of the bendable member 240 may be fixed to the second bracket housing 210b of the first housing 210. When this assembly state is maintained, the plurality of engaging protrusions 242 protruding from the bendable member 240 may penetrate the guide slits 2624 formed through the plate part 262, may be received to be engaged with the second surface 2622, and then may move along the guide slits 2624 according to the movement of the bendable member 240. For example, the plurality of engaging protrusions 242 protruding from the bendable member 240 may penetrate the guide slits 2624 formed through the plate part 262 along direction □ illustrated herein, and then may be caught on the second surface 2622 of the plate part 262 to be prevented from being separated in direction □. Therefore, a phenomenon in which the bendable member 240 is lifted from the support plate 261 by the force generated when the flexible display 230 is unfolded in a bent region corresponding to the pressing part 263 may be reduced through the engaging structure of the plurality of engaging protrusions 242.

According to various embodiments, the plurality of engaging protrusions 242 may have a length along the slide-out direction (direction □) and the slide-in direction (direction □) and may have an arrangement having two rows which are arranged to be guided to two guide slits 2624 spaced apart at a predetermined interval, respectively. In an embodiment, the plurality of engaging protrusions 242 may have a length along the slide-out direction (direction □) and the slide-in direction (direction □) and may have an arrangement having at least three rows which are arranged to be guided to at least three guide slits 2624 spaced apart at a predetermined interval, respectively.

Figure 10A:
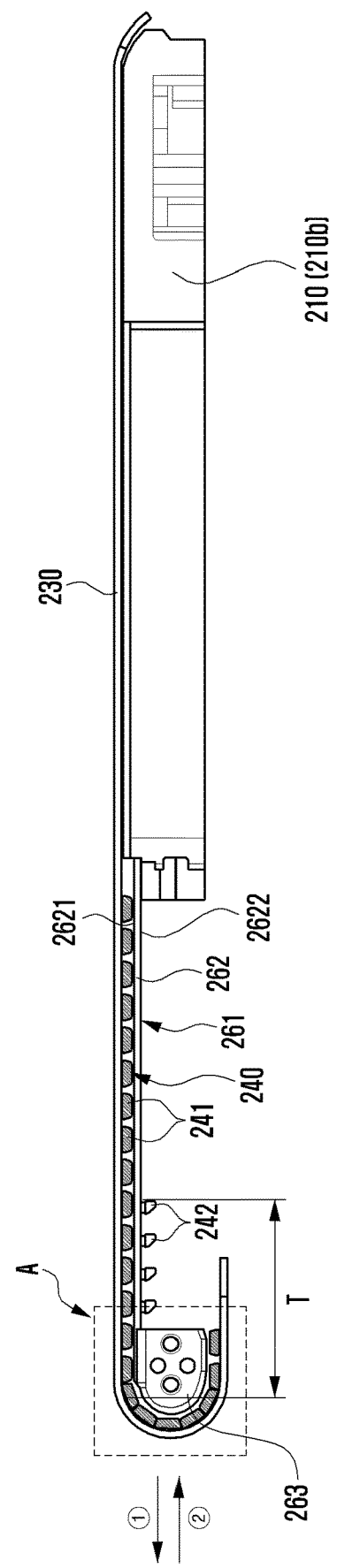
FIG. 10A illustrates an arrangement state of a flexible display supported by a first housing and a support plate according to an embodiment of the disclosure.

FIG. 10A illustrates an arrangement state of a flexible display supported by a first housing and a support plate according to an embodiment of the disclosure.

Referring to FIG. 10A, the support plate 261 may be slidably coupled to the first housing 210. According to one embodiment, the plate part 262 of the support plate 261 may be slidably coupled to the second bracket housing 210b of the first housing 210. According to one embodiment, since the support plate 261 is fixed to the second housing (e.g., the second housing 220 of FIG. 5), the support plate 261 may also be moved together when the second housing 220 is slid into and/or slid out from the first housing 210. According to one embodiment, at least a portion of the bendable member 240 may be fixed to the first housing 210, and the support plate 261 and the second housing 220 may be slidably coupled to at least a portion of the first housing 210. According to one embodiment, one end of the bendable member 240 may be fixed to the first housing 210, and at least a portion of the bendable member may be disposed to be supported by the plate part 262 of the support plate 261, and at least other portions of the bendable member may be retained in a bent state along the curved surface of the pressing part 263. In this case, the at least a portion of the bendable member 240 may form the same plane as the first housing 210 in the slide-out state and thus may support at least a portion of the flexible display 230. For example, the bendable member 240 may be disposed on the support plate 261 such that the step portion formed when the first surface 2621 is disposed lower than the outer surface of the first housing 210 is compensated, whereby the bendable member 240 and the first housing 210 may provide a flat surface for supporting the flexible display 230. According to one embodiment, in the slide-in state, at least a portion of the bendable member 240 may be received in the second space (e.g., the second space 2201 of FIG. 5) of the second housing 220 together with at least a portion of the flexible display 230 while being supported by the pressing part 263. According to one embodiment, the flexible display 230 may be fixed to the first housing 210 and the bendable member 240 by attachment through bonding or taping. According to one embodiment, the plurality of engaging protrusions 242 may be disposed only in the section (T) of the bendable member 240 in which deformation may occur through the slide-in and/or slide-out operation. In an embodiment, the plurality of engaging protrusions 242 may be disposed in the entire section of the bendable member 240.

According to various embodiments, the bendable member 240 may be stably transitioned from the slide-in state to the slide-out state through the engaging structure of the plurality of engaging protrusions 242 and the guide slits 2624 while being maintained in close contact with the support plate 261, thereby advantageously providing improved surface quality to the flexible display 230.

Figure 10B:
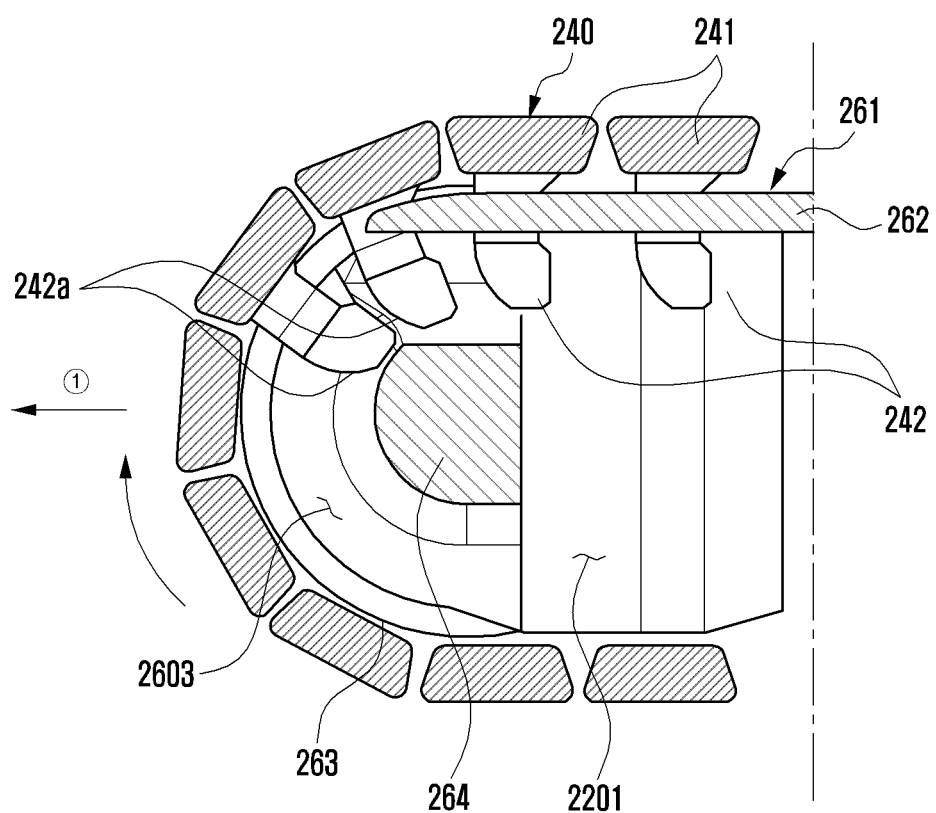
FIGS. 10B and 10C are schematic diagrams illustrating positions of engaging protrusions according to operation states of an electronic device with respect to region A of FIG. 10A according to various embodiments of the disclosure.
Figure 10C:
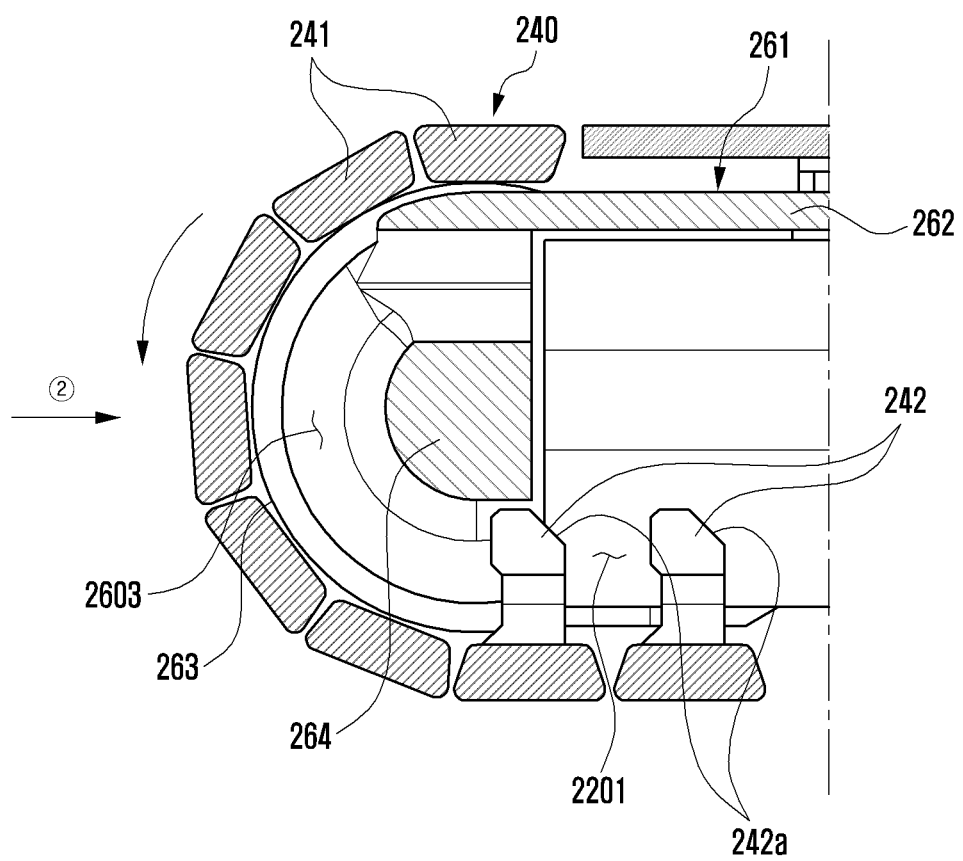

FIGS. 10B and 10C are schematic diagrams illustrating positions of engaging protrusions according to operation states of an electronic device with respect to region A of FIG. 10A according to various embodiments of the disclosure.

Referring to FIG. 10B, when the second housing (e.g., the second housing 220 of FIG. 5) is slid out in a predetermined direction (direction □), due to the plurality of engaging protrusions 242 which are engaged with and guided by the guide slits 2624 formed through the support plate 261, at least a portion of the bendable member 240 may be continuously maintained in close contact with the support plate 261 even if the force generated when the flexible display 230 is unfolded near the pressing part 263 is applied thereto. In this case, specific engaging protrusions of the plurality of engaging protrusions 242, received in the second space 2201 of the second housing 220, may be moved outside without being interfered with by the connection part 264 having a diameter smaller than that of the pressing part 263. In an embodiment, specific engaging protrusions of the plurality of engaging protrusions 242, received in the second space 2201 of the second housing 220, may be moved while being supported by the outer surface of the connection part 264 having a diameter smaller than that of the pressing part 263. The plurality of engaging protrusions 242 may be easily introduced into one or more guide slits 2624 through the introduction portion (e.g., the introduction portion 262b of FIG. 8) of the guide slits 2624 formed in a straight line parallel to the plate part 262.

Referring to FIG. 10C, when the second housing (e.g., the second housing 220 of FIG. 5) is slid in a predetermined direction (direction □), the plurality of engaging protrusions 242, together with at least a portion of the bendable member 240, may be separated from the one or more guide slits 2624 formed through the support plate 261, and then may be received in the second space 2201 of the second housing 220 through the distancing space 2603. In this case, the plurality of engaging protrusions 242 may be received in the second space 2201 through the distancing space (e.g., the distancing space 2603 of FIG. 8) formed on the pressing part 263, thereby advantageously allowing the bendable member 240 to be in close contact with the outer surface of the pressing part 263 during operation. In addition, the plurality of engaging protrusions 242 may become thin through the inclined surface 242a, and accordingly, interference therebetween may be minimized when the bendable member 240 is bent to be received in the second space 2201.

Figure 11A:
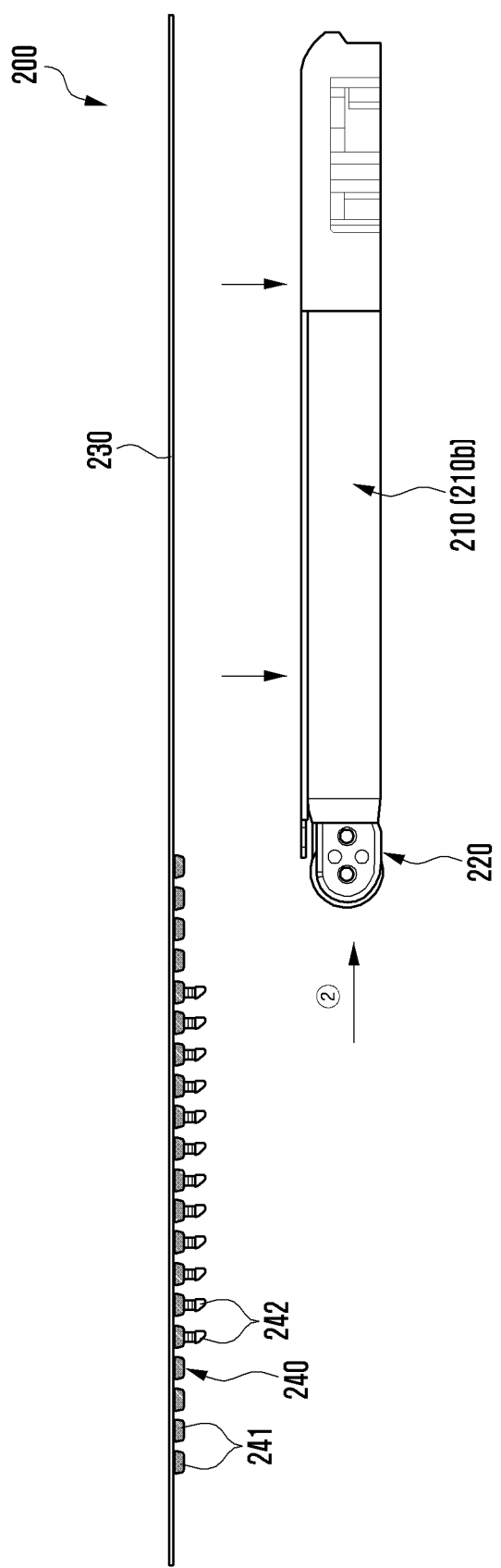
FIGS. 11A and 11B illustrate an assembly process of a bendable member to which a flexible display is attached, according to various embodiments of the disclosure.
Figure 11B:
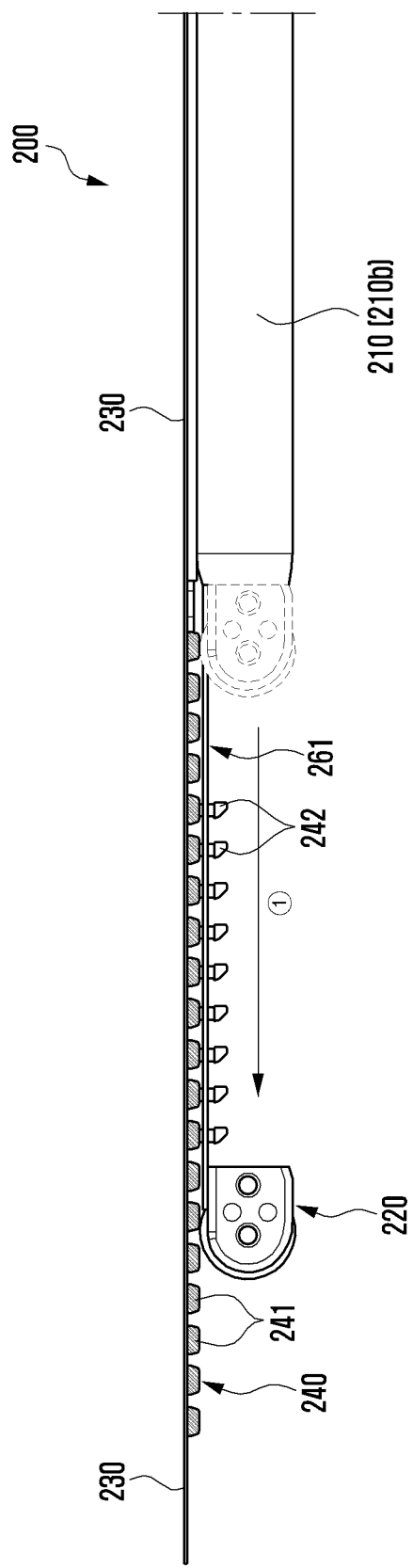

FIGS. 11A and 11B illustrate an assembly process of a bendable member to which a flexible display is attached, according to various embodiments of the disclosure. The bendable member 240 including the lifting prevention structure according to the various embodiment of the disclosure may be easily assembled to the first housing 210 and the second housing 220.

Referring to FIGS. 11A and 11B, the bendable member 240 to which a portion of the flexible display 230 is attached may be provided. According to one embodiment, the bendable member 240 may include a plurality of engaging protrusions 242 at least partially protruding from at least specific multi-bars 241 of the plurality of multi-bars 241. According to one embodiment, in a state in which the first housing 210 and the second housing 220 are coupled to each other, the portion of the flexible display 230, to which the bendable member 240 is not attached, may be attached to the first housing 210. After that, only by an operation of transitioning to the slide-out direction (direction □) when the second housing 220 is slid in in a predetermined direction (direction □), the plurality of engaging protrusions 242 may be naturally guided to the one or more guide slits (e.g., the one or more guide slits 2624 of FIG. 8) of the support plate 261 disposed in the second housing 220, thereby completing the assembly thereof. For example, the electronic device 200 according to an embodiment of the disclosure may provide an improved assembly structure of the flexible display 230 and the bendable member 240 through an open structure formed by connecting the one or more guide slits (e.g., the one or more guide slits 2624 of FIG. 8) formed through the plate part 262 of the support plate 261 up to the distancing space (e.g., the distancing space 2603 of FIG. 8) of the pressing part (e.g., the pressing part 263 of FIG. 8).

Figure 12A:
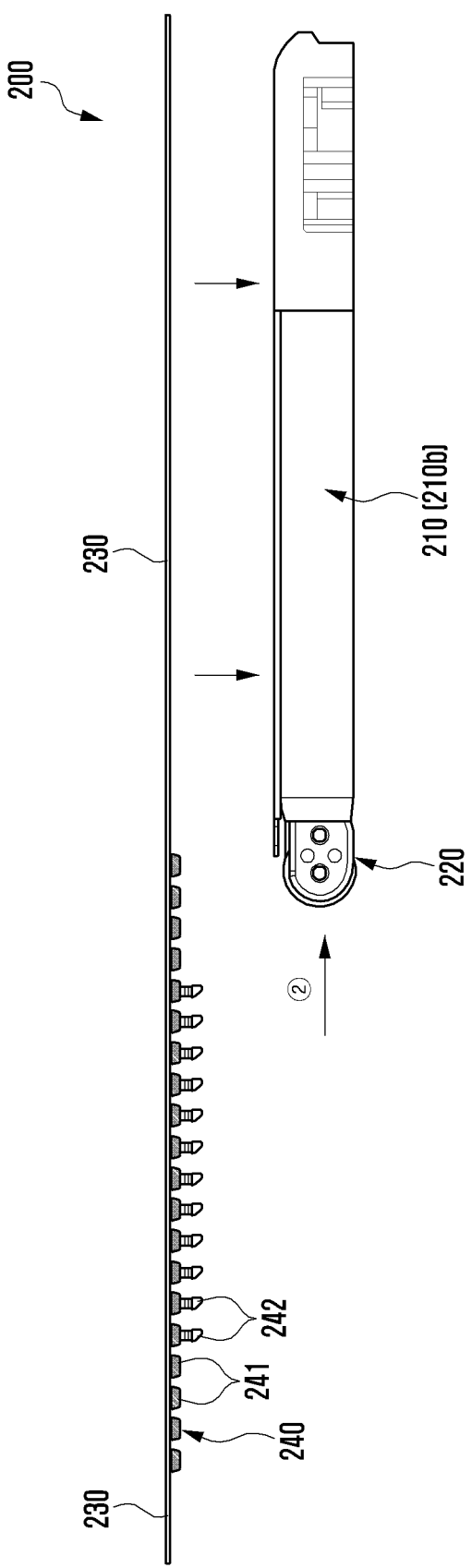
FIGS. 12A, 12B, and 12C illustrate an assembly process of a bendable member to which a flexible display is attached, according to various embodiments of the disclosure.
Figure 12B:
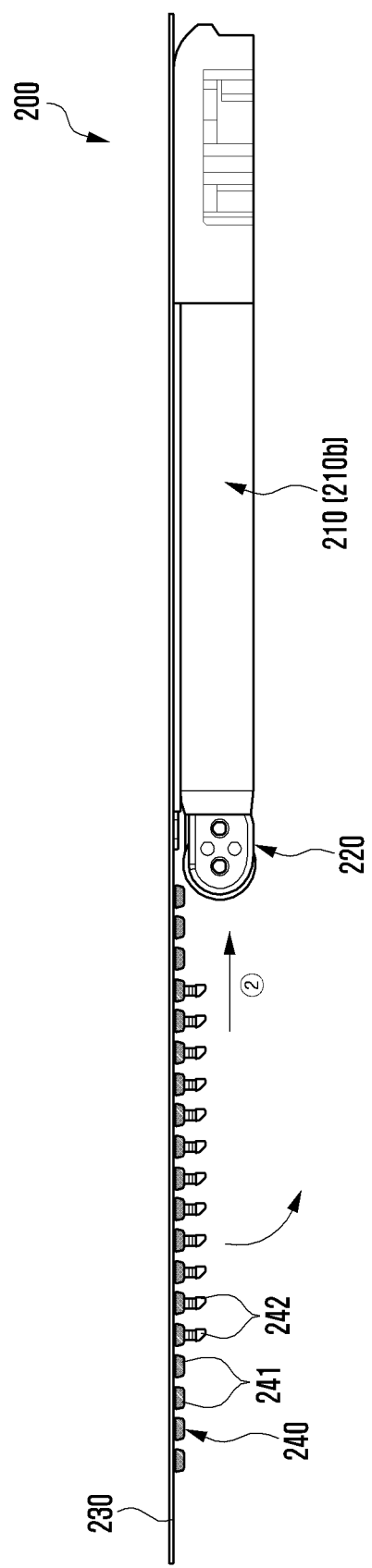
Figure 12C:
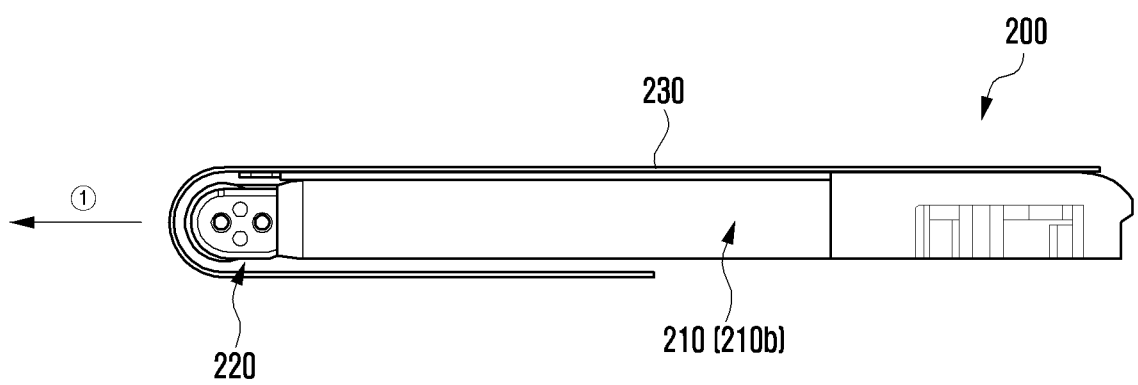

FIGS. 12A to 12C illustrate an assembly process of a bendable member to which a flexible display is attached, according to various embodiments of the disclosure. The bendable member 240 including the lifting prevention structure according to the embodiment of the disclosure may be easily assembled to the first housing 210 and the second housing 220.

Referring to FIGS. 12A to 12C, the bendable member 240 to which a portion of the flexible display 230 is attached may be provided. According to one embodiment, the bendable member 240 may include a plurality of engaging protrusions 242 at least partially protruding from at least specific multi-bars 241 of the plurality of multi-bars 241. According to one embodiment, in a state in which the first housing 210 and the second housing 220 are coupled to each other, at least a partial region of the flexible display 230, to which the bendable member 240 is not attached, may be attached to the first housing 210. According to an embodiment, the flexible display 230 may have a first length corresponding an attachment region where the same is attached to the bendable member 240 and the first housing 210. In an embodiment, the flexible display 230 may be attached to the bendable member 240 and the first housing 210, and may also include, for example, a second length longer than the first length, the second length including at least another partial region where the flexible display 230 is not attached to the bendable member 240. In this case, at least another partial region where the flexible display 230 is not attached to the bendable member 240 may be disposed to be supported by a separate internal structure (e.g., support bracket) disposed in the electronic device 200. Then, in a state in which the second housing 220 is slid in in a predetermined direction (direction □), the flexible display 230 may be rotated to be wound in the second housing 220. After that, the second housing 220 may be slid out in a predetermined direction (direction □), and accordingly, the plurality of engaging protrusions 242 may be naturally guided to the one or more guide slits (e.g., the one or more guide slits 2624 of FIG. 8) of the support plate 261 disposed in the second housing 220, thereby completing the assembly thereof. For example, the electronic device 200 according to an embodiment of the disclosure may provide an improved assembly structure of the flexible display 230 and the bendable member 240 through an open structure formed by connecting the one or more guide slits (e.g., the one or more guide slits 2624 of FIG. 8) formed through the plate part 262 of the support plate 261 up to the distancing space (e.g., the distancing space 2603 of FIG. 8) of the pressing part (e.g., the pressing part 263 of FIG. 8).

Figure 13A:
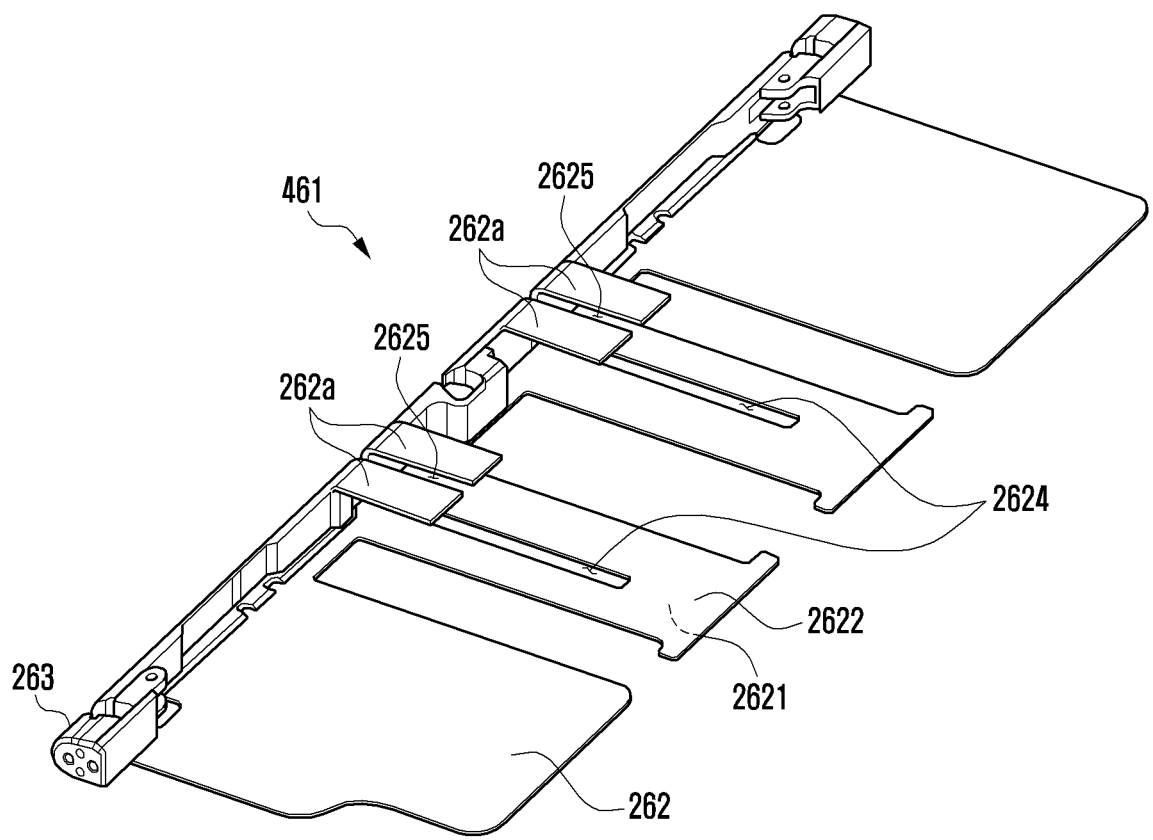
FIG. 13A is a perspective view of a support plate according to an embodiment of the disclosure.

FIG. 13A is a perspective view of a support plate according to an embodiment of the disclosure.

Figure 13B:
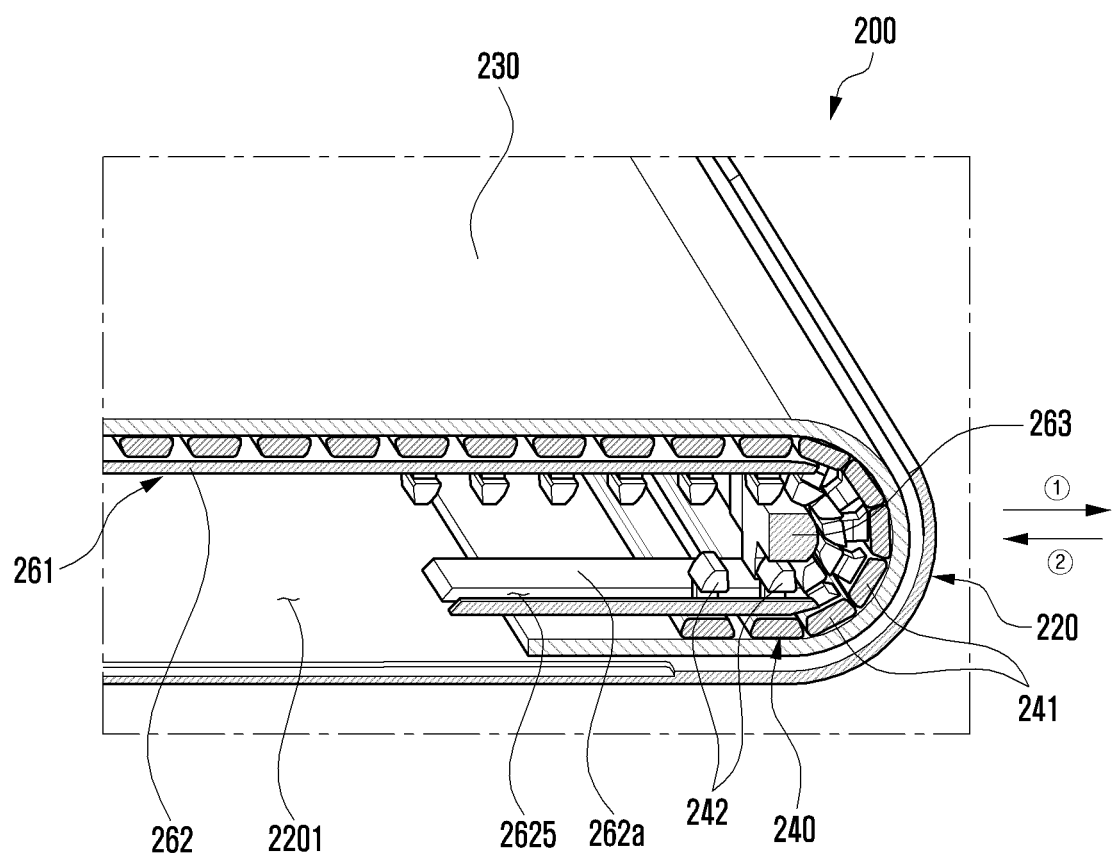
FIG. 13B is a partial cross-sectional perspective view of an electronic device, illustrating a state in which a bendable member is coupled to the support plate of FIG. 13A according to an embodiment of the disclosure.

FIG. 13B is a partial cross-sectional perspective view of an electronic device, illustrating a state in which bendable member is coupled to the support plate of FIG. 13A according to an embodiment of the disclosure.

The support plate 461 of FIG. 13A may be at least partially similar to the support plate 261 of FIG. 4, or may further include other embodiments of a support plate.

Referring to FIGS. 13A to 13B, the support plate 461 (e.g., the support plate 261 of FIG. 4) may include a plate part 262, and a pressing part 263 extending from the plate part 262, the plate part including a first surface 2621, and a second surface 2622 facing in a direction opposite to the first surface 2621. According to one embodiment, the support plate 461 may include one or more guide slits 2624 formed through the plate part 262. According to one embodiment, the pressing part 263 and the plate part 262 including one or more guide slits 2624 may have substantially the same configuration as that of FIG. 8.

According to various embodiments, the support plate 461 may include at least one auxiliary plate portion 262a extending from the pressing part 263 to correspond to the second surface 2622, and at least one auxiliary guide slit 2625 formed through the at least one auxiliary plate portion 262a. According to one embodiment, the auxiliary plate portion 262a may be maintained to be spaced apart from the plate part 262 by a predetermined interval. According to one embodiment, when the electronic device 200 is in the slide-in state, the auxiliary guide slit 2625 may be disposed to extend from the guide slit 2624 formed through the plate part 262 through the distancing space (e.g., the distancing space 2603 of FIG. 8) to guide the plurality of engaging protrusions 242. For example, when the first surface 2621 is viewed from above, the auxiliary guide slit 2625 may be disposed to overlap the guide slit 2624. Accordingly, even if the electronic device 200 is transitioned from the slide-out state to the slide-in state and at least a portion of the bendable member 240 and the engaging protrusions 242 are received in the second space 2201 of the second housing 220, the plurality of engaging protrusions 242 may be guided from the guide slit 2624 to the auxiliary guide slit 2625 through the distancing space (e.g., the distancing space 2603 of FIG. 8). In one embodiment, the pressing part 263 may be structurally coupled to the plate part 262 and the auxiliary plate portion 262a as a separate component. According to one embodiment, the support plate 461 may be formed of a metal material and/or a non-metal material (e.g., injection molded material).

Figure 14A:
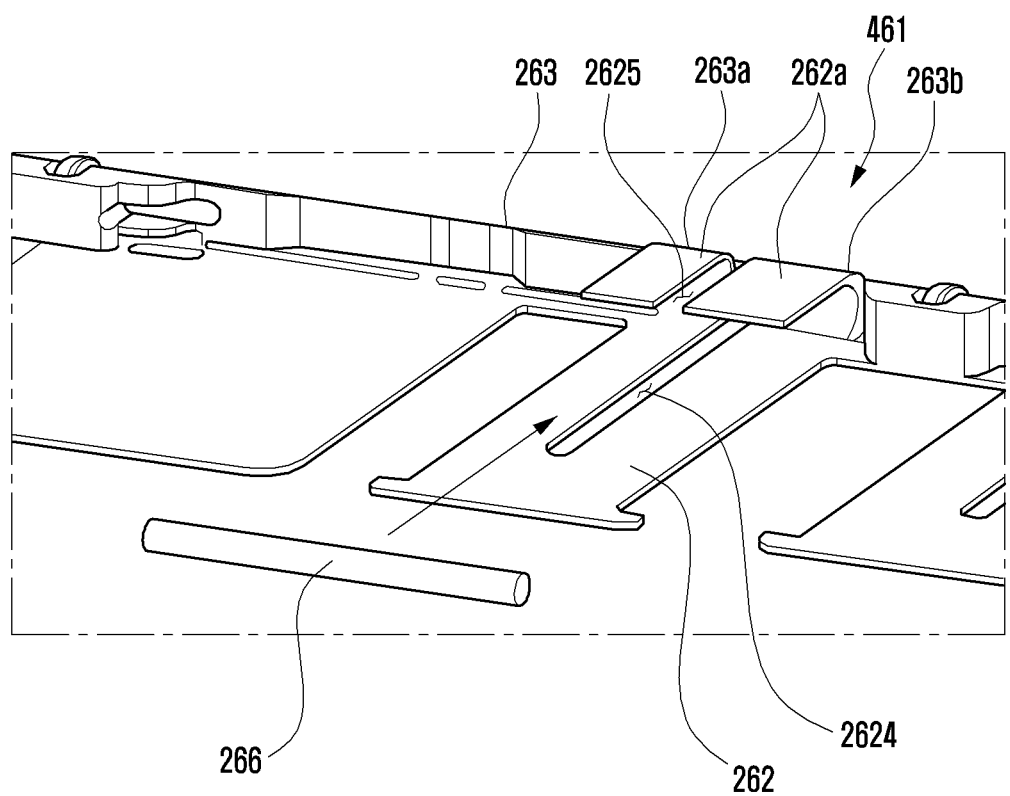
FIGS. 14A and 14B are partial perspective views of a support plate including a connection part according to various embodiments of the disclosure.
Figure 14B:
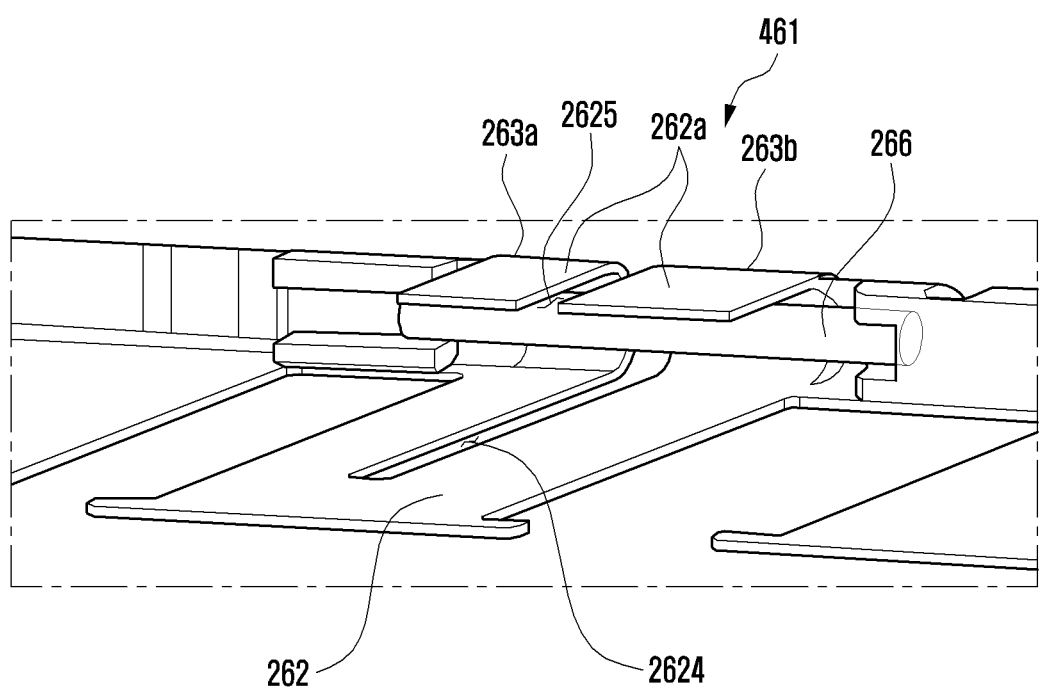

FIGS. 14A and 14B are partial perspective views of a support plate including a connection part according to various embodiments of the disclosure.

Referring to FIGS. 14A and 14B, the support plate 461 may include a plate part 262 and a pressing part 263 extending from the plate part 262. According to one embodiment, the support plate 461 may include one or more guide slits 2624 formed through the plate portion 262 and configured to guide the plurality of engaging projections (e.g., the plurality of engaging protrusions 242 of FIG. 13B) protruding from the bendable member 240. According to one embodiment, the support plate 461 may further include an auxiliary plate portion 262a extending from the pressing part 263 and including an auxiliary guide slit 2625 extending from the guide slit 2624. According to one embodiment, the pressing part 263 may have a distancing space (e.g., the distancing space 2603 of FIG. 8) such that the guide slit 2624 and the auxiliary guide slit 2625 are seamlessly connected, and may include segmented first portion 263a and second portion 263b, which are formed left and right through the distancing space 2603. According to one embodiment, the support plate 461 may include a connection part 266 disposed to connect the first portion 263a and the second portion 263b of the pressing part 263. According to one embodiment, the connection part 266 may be formed in the shape of a shaft made of a metal material. According to one embodiment, the outer surface of the connection part 266 may have a curved shape to be used as a support structure for supporting the plurality of engaging protrusions 242 in the bent region. According to one embodiment, the connection part 266 may be attached to the support plate 461 made of a metal material through a welding process. In an embodiment, the connection part 266 may be attached to the support plate 461 through at least one of bonding, welding, or taping. Accordingly, the rigidity of the support plate 461 can be advantageously reinforced through the connection part 266 connecting the two separated portions 263a and 263b of the pressing part 263 by the guide slits 2624 and 2625.

Figure 15A:
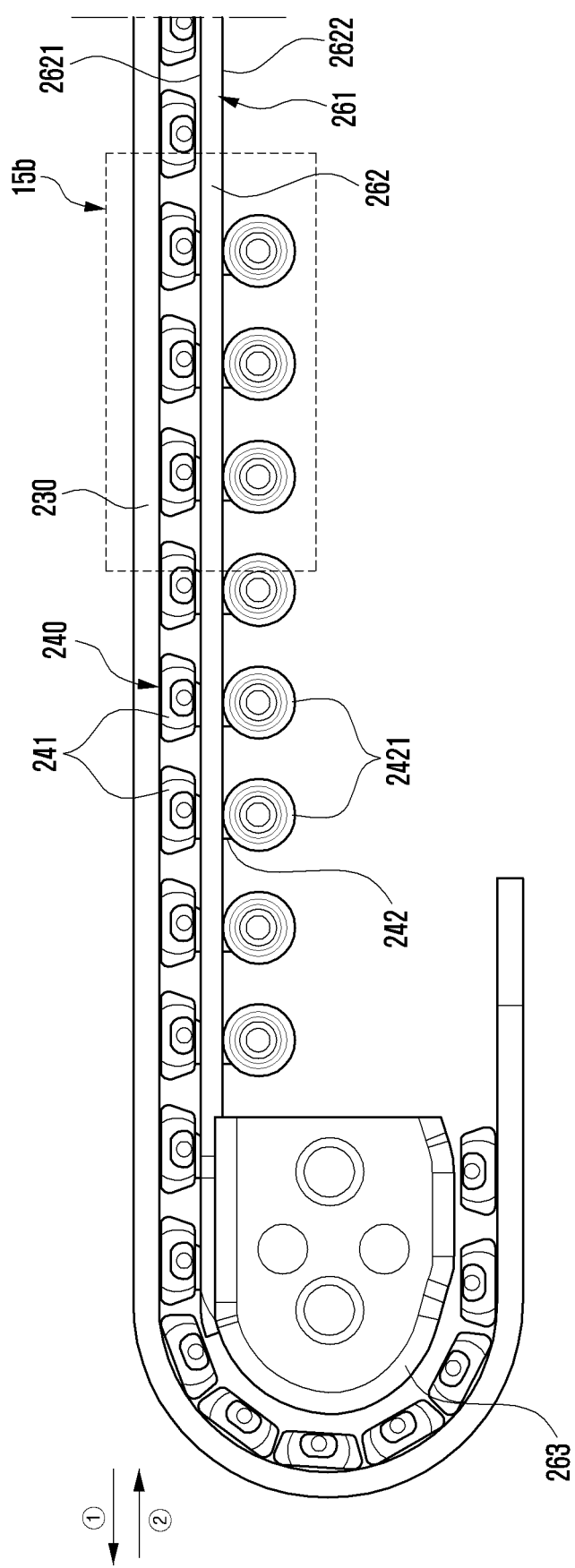
FIG. 15A illustrates a state in which a bendable member is assembled to a support plate according to an embodiment of the disclosure.

FIG. 15A illustrates a state in which a bendable member is assembled to a support plate according to an embodiment of the disclosure.

Figure 15B:
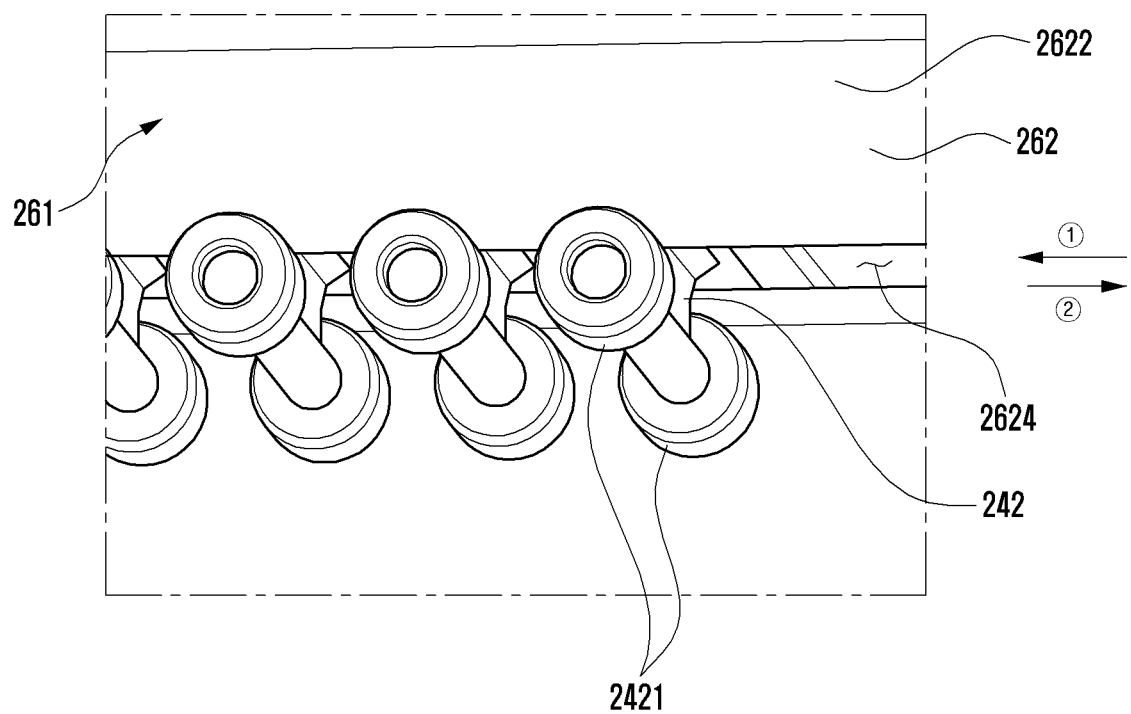
FIG. 15B is an enlarged perspective view of region 15B of FIG. 15A according to an embodiment of the disclosure.

FIG. 15B is an enlarged perspective view of region 15b of FIG. 15A according to an embodiment of the disclosure.

Referring to FIGS. 15A and 15B, the plurality of engaging protrusions 242 protruding from the bendable member 240 may penetrate the guide slits 2624 formed through the plate part 262 of the support plate 261, and then may be guided in the slide-out direction (direction □) or in the slide-in direction (direction □) while being engaged with the second surface 2622. In this case, the plurality of engaging protrusions 242 may be in contact with the second surface 2622 of the plate part 262 of the support plate 261 during movement and may cause frictional force, and this frictional force may hinder the sliding operation of the electronic device 200 or may provide an unpleasant sliding feeling to a user. To solve this problem, the bendable member 240 may include one or more guide rollers 2421 disposed on the plurality of engaging protrusions 242, respectively. In an embodiment, the at least one guide roller 2421 may be installed only on specific engaging protrusions of the plurality of engaging protrusions 242. According to one embodiment, the one or more guide rollers 2421 may be installed to be self-rotatable at each of the plurality of engaging protrusions 242. Accordingly, when the engaging protrusions 242 of the bendable member 240 is positioned in the guide slits 2624 formed through the plate part 262 of the support plate 261, the plurality of guide rollers 2421 may be in contact with the second surface 2622 of the plate part 262, thereby advantageously reducing frictional force due to the sliding operation between the support plate 261 and the bendable member 240.

Figure 16A:
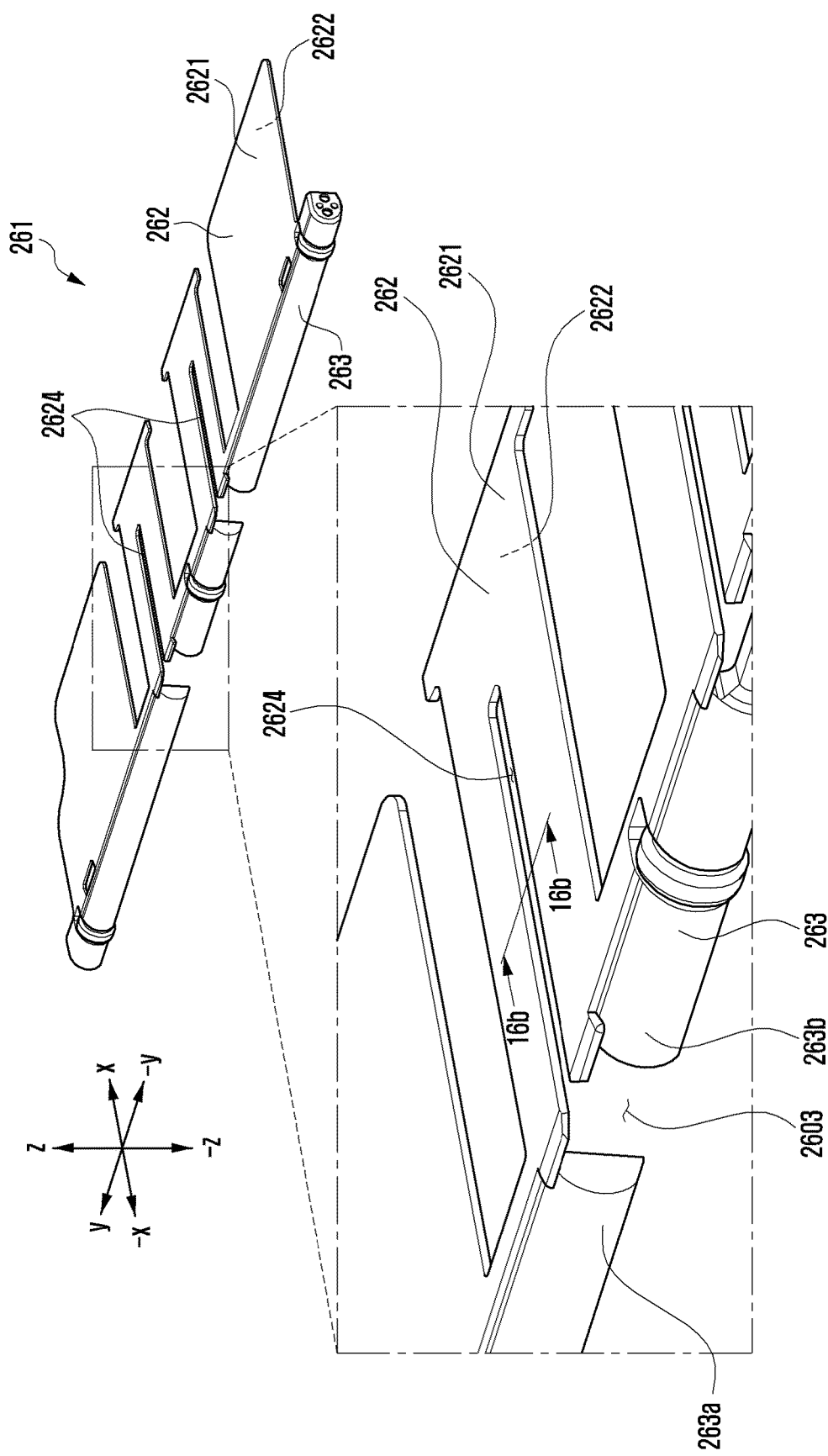
FIG. 16A is a perspective view of a support plate according to an embodiment of the disclosure.

FIG. 16A is a perspective view of a support plate according to an embodiment of the disclosure.

Figure 16B:
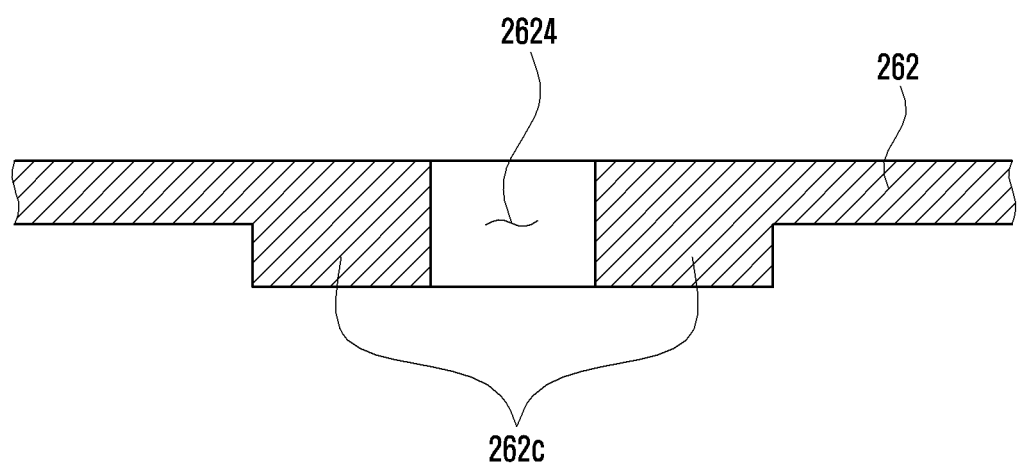
FIG. 16B is a partial cross-sectional view of a plate part taken along line 16b-16b of FIG. 16A according to an embodiment of the disclosure.

FIG. 16B is a partial cross-sectional view of a plate part taken along line 16b-16b of FIG. 16A according to an embodiment of the disclosure.

In the description of the components of the support plate 261 of FIGS. 16A and 16B, the same reference numerals are assigned to the components substantially the same as those of the support plate 261 of FIG. 8, and a detailed description thereof may be omitted.

Referring to FIG. 16A, the support plate 261 may include a plate part 262 including a guide slit 2624, and a pressing part 263 extending from the plate part 262. According to one embodiment, in order to provide easy assembly of the plurality of engaging projections (e.g., the plurality of engaging protrusions 242 of FIG. 9) of the bendable member (e.g., the bendable member 240 of FIG. 9), the support plate 261 may have a portion of the pressing part 263 which is segmented into a first portion 263a and a second portion 263b and may have a distancing space 2603 connected to the guide slit 2624. In this case, unlike the description above, the connection part (e.g., the connection part 264 of FIG. 8 or the connection part 266 of FIG. 14A) connecting the first portion 263a and the second portion 263b of the pressing part 263 may be omitted.

Referring to FIG. 16B, in order to reinforce the rigidity of the support plate 261, the plate part 262 may be formed thick on peripheral portion 262c of the guide slit 2624, compared to other portions thereof. According to one embodiment, the peripheral portion 262c of the guide slit 2624 may be stepped to have a thickness greater than other portions. In an embodiment, the peripheral portion 262c of the guide slit 2624 may gradually thicken toward a direction perpendicular (e.g., y axis direction of FIG. 16A) to the longitudinal direction of the guide slit.

According to various embodiments, the electronic device (e.g., the electronic device 200 of FIG. 4) may include a first housing (e.g., the first housing 210 of FIG. 4) including a first space (e.g., the first space 2101 of FIG. 4), a second housing (e.g., the second housing 220) coupled to the first housing to be slidable along a first direction (e.g., direction □ of FIG. 4) and including a second space (e.g., the second space 2201 of FIG. 4), a bendable member (e.g., the bendable member 240 of FIG. 4) connected to the first housing, at least partially accommodated in the second space in a slide-in state, and at least partially forming the same plane as the first housing in a slide-out state, a support plate (e.g., the support plate 261 of FIG. 8) including a plate part (e.g., the plate part 262 of FIG. 8), and a pressing part (e.g., the pressing part 263 of FIG. 8) extending from the plate part and supporting at least a portion of the bent bendable member in the slide-in state, the plate part including a first surface (e.g., the first surface 2621 of FIG. 8) facing the bendable member, and a second surface (e.g., the second surface 2622 of FIG. 8) facing a direction opposite to the first surface, and a flexible display (e.g., the flexible display 230 of FIG. 4) disposed to be supported by at least a portion of the bendable member and at least a portion of the first housing. The support plate may include a guide slit (e.g., the guide slit 2624 of FIG. 4) formed through the plate part to have a length along a first direction (e.g., direction □ of FIG. 4). The bendable member may include a plurality of engaging protrusions (e.g., the plurality of engaging protrusions 242 of FIG. 4) protruding at a predetermined interval and configured to penetrate the guide slit.

According to various embodiments, the bendable member may at least partially form the same plane as the first housing in the slide-out state.

According to various embodiments, at least a portion of the bendable member may be bent while being in close contact with the first surface of the plate part through the plurality of engaging protrusions.

According to various embodiments, the plurality of engaging protrusions may be disposed in a corresponding section of the bendable member, corresponding to a section where the flexible display is bent during transition from the slide-in state to the slide-out state.

According to various embodiments, the flexible display may be attached to the bendable member to be fixed thereto.

According to various embodiments, the bendable member may include a plurality of multi-bars coupled to be rotatable with respect to each other, and the plurality of engaging protrusions may be integrally formed with the plurality of multi-bars.

According to various embodiments, the plurality of engaging protrusions may be disposed on at least specific multi-bars of the plurality of multi-bars.

According to various embodiments, the electronic device may further include a guide rail disposed in the first housing or the second housing among the first housing and the second housing, and the remaining housing may be coupled to be guided in the first direction along the guide rail.

According to various embodiments, the at least one guide slit may be disposed within a range corresponding to 50% of the entire length, with reference to the center the support plate, along a second direction perpendicular to the first direction.

According to various embodiments, the electronic device may further include a friction reducing structure disposed between the second surface and the plurality of engaging protrusions.

According to various embodiments, the friction reducing structure may include a Teflon coating layer or a hard coating layer disposed on a contact portion of the second surface and/or the plurality of engaging protrusions.

According to various embodiments, the friction reduction structure may further include at least one guide roller rotatably coupled to each of the plurality of engaging protrusions, and the at least one guide roller may be in contact with the second surface.

According to various embodiments, the plurality of engaging protrusions may be disposed to penetrate the plate part through the at least one guide slit and then to be engaged with the second surface.

According to various embodiments, the pressing part may include a distancing space by which the pressing part is at least partially divided into a first portion and a second portion, and the distancing space may be connected to the guide slit.

According to various embodiments, the first portion and the second portion may be connected to each other through a connection part having a diameter smaller than that of the pressing part.

According to various embodiments, the connection part may be integrally formed with the pressing part.

According to various embodiments, the connection part may connect the second portion to the first portion to be fixed to the support plate.

According to various embodiments, the electronic device may further include an auxiliary plate portion extending from the pressing part to correspond to at least a portion of the second surface and spaced apart from the plate part by a predetermined interval, and when the first surface is viewed from above, the auxiliary plate portion may include at least one auxiliary guide slit formed to overlap the at least one guide slit.

According to various embodiments, the display device may include a flexible display (e.g., the flexible display 230 of FIG. 3A) a bent region (e.g., the second portion 230b of FIG. 3A) that is at least partially bent according to deformation of at least one housing (e.g., the first housing 210 and the second housing 220 of FIG. 3A), a bendable member (e.g., the bendable member 240 of FIG. 5) disposed to support the bent region, and a plurality of engaging protrusions (e.g., the engaging protrusions 242 of FIG. 5) formed on the bendable member at a predetermined interval along a bending direction, and when the bendable member is bent, the plurality of engaging protrusions may become thinner as the same protrude further away from the bendable member.

According to various embodiments, the plurality of engaging protrusions may be formed in an undercut shape enabling the engaging protrusions to penetrate a guide slit formed through a target structure and then to be engaged therewith, and at least a portion of the bendable member may be maintained in close contact with the outer surface of the target structure through the plurality of engaging protrusions.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   a first housing;
   a second housing slidably coupled to the first housing along a first direction and moving with respect to the first housing between a slide-in state and a slide-out state;
   a bendable member comprising a plurality of multi-bars;
   a support plate configured to support at least a portion of the bendable member; and
   a flexible display supported by the bendable member,
   wherein the support plate comprises a guide slit formed to have a length along the first direction,
   wherein a part of multi-bars among the plurality of multi-bars, which are positioned corresponding to a portion of the flexible display that is exposed to the outside of the electronic device in the slide-out state comprise a plurality of engaging protrusions configured to be engaged with the guide slit, and
   wherein the bendable member comprises a guide protrusion formed at each of the opposite ends of each of the plurality of multi-bars, each of the guide protrusions is guided to move along a guide groove formed at a position corresponding to the guide protrusion in the second housing.

2. The electronic device of claim 1, wherein the bendable member at least partially forms an identical plane with the first housing in the slide-out state.

3. The electronic device of claim 1,
   wherein the support plate comprises a plate part and a pressing part extending from the plate part,
   wherein the plate part comprises a first surface facing the bendable member and a second surface facing a direction opposite to the first surface, and
   wherein at least a portion of the bendable member is bent while being in close contact with the first surface of the plate part through the plurality of engaging protrusions.

4. The electronic device of claim 3, further comprising a friction reducing structure disposed between the second surface and the plurality of engaging protrusions.

5. The electronic device of claim 4, wherein the friction reducing structure comprises a Teflon coating layer or a hard coating layer disposed on a contact portion of at least one of the second surface or the plurality of engaging protrusions.

6. The electronic device of claim 3,
   wherein the pressing part comprises a distancing space by which the pressing part is at least partially divided into a first portion and a second portion, and
   wherein the distancing space is connected to the guide slit.

7. The electronic device of claim 6, wherein the first portion and the second portion are connected to each other through a connection part having a diameter smaller than that of the pressing part.

8. The electronic device of claim 7, wherein the connection part is integrally formed with the pressing part.

9. The electronic device of claim 7, wherein the connection part connects the second portion to the first portion to be fixed to the support plate.

10. The electronic device of claim 3, further comprising:
    an auxiliary plate portion extending from the pressing part to correspond to at least a portion of the second surface and spaced apart from the plate part by a predetermined interval,
    wherein when the first surface is viewed from above, the auxiliary plate portion comprises at least one auxiliary guide slit formed to overlap the guide slit.

11. The electronic device of claim 1, wherein the plurality of engaging protrusions are disposed in a corresponding section of the bendable member, corresponding to a section where the flexible display is bent during transition from the slide-in state to the slide-out state.

12. The electronic device of claim 1, wherein the flexible display is attached to the bendable member to be fixed thereto.

13. The electronic device of claim 1,
    wherein the plurality of multi-bars are coupled to be rotatable with respect to each other, and
    wherein the plurality of engaging protrusions are integrally formed with the plurality of multi-bars.

14. The electronic device of claim 1, further comprising:
    a guide rail disposed in the first housing or the second housing among the first housing and the second housing,
    wherein the remaining housing is coupled to be guided in the first direction along the guide rail.

15. The electronic device of claim 1, wherein the guide slit is disposed within a range corresponding to 50% of an entire length, with reference to a center of the each of the plurality of multi-bars, along a second direction perpendicular to the first direction.

16. The electronic device of claim 1, further comprising at least one guide roller rotatably coupled to each of the plurality of engaging protrusions,
    wherein the at least one guide roller is in contact with the support plate.

17. The electronic device of claim 1, wherein the plurality of engaging protrusions are disposed to penetrate the support plate through the guide slit and then to be engaged with a rear surface of the support plate.

18. A display device comprising:
    a flexible display comprising a bent region that is at least partially bent according to deformation of at least one housing;
    a bendable member disposed to support at least the bent region of the flexible display; and
    a plurality of engaging protrusions formed on the bendable member at a predetermined interval along a bending direction,
    wherein the plurality of engaging protrusions become thinner as the engaging protrusions protrude further away from the bendable member, and
    wherein the plurality of engaging protrusions are formed in an undercut shape enabling the plurality of engaging protrusions to penetrate through a guide slit formed on a target structure disposed parallel to a surface of the flexible display and then to be engaged with the target structure, and
    wherein each of the plurality of engaging protrusions includes a tapered inclined surface tapering one side of an end furthest from the bendable member, the tapered inclined surface configured to minimize interference between engaging protrusions when the bendable member is bent.

19. The display device of claim 18,
    wherein at least a portion of the bendable member is maintained in close contact with an outer surface of the target structure through the plurality of engaging protrusions.

* * * * *